United States Patent
Yao

(10) Patent No.: US 8,583,856 B2
(45) Date of Patent: Nov. 12, 2013

(54) MEMORY SYSTEM

(75) Inventor: Hiroshi Yao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 12/882,703

(22) Filed: Sep. 15, 2010

(65) Prior Publication Data

US 2011/0213913 A1 Sep. 1, 2011

(30) Foreign Application Priority Data

Feb. 26, 2010 (JP) ................................. 2010-043299

(51) Int. Cl.
*G06F 12/00* (2006.01)

(52) U.S. Cl.
USPC ...................................... 711/103; 365/185.33

(58) Field of Classification Search
USPC ...................................... 711/103; 365/185.33
See application file for complete search history.

(56) References Cited

U.S. PATENT DOCUMENTS

| | | | | |
|---|---|---|---|---|
| 5,561,786 A * | 10/1996 | Morse | ............................ | 711/170 |
| 2007/0245070 A1 * | 10/2007 | Mitsunaga | ...................... | 711/103 |
| 2010/0174845 A1 * | 7/2010 | Gorobets et al. | .............. | 711/103 |
| 2010/0205356 A1 * | 8/2010 | Mukaida et al. | ............... | 711/103 |

FOREIGN PATENT DOCUMENTS

| | | |
|---|---|---|
| JP | 2000-122923 | 4/2000 |
| JP | 2009-211232 | 9/2009 |
| WO | WO 2008/087634 A1 | 7/2008 |
| WO | WO 2009/130848 A1 | 10/2009 |

OTHER PUBLICATIONS

Japanese Office Action issued Dec. 13, 2011, in Patent Application No. 2010-043299 (with English-language translation).

* cited by examiner

*Primary Examiner* — Hashem Farrokh
(74) *Attorney, Agent, or Firm* — Oblon, Spivak, McClelland, Maier & Neustadt, L.L.P.

(57) ABSTRACT

According to one embodiment, a memory system includes a nonvolatile memory, a managing unit, an order rule holding unit, a position information storing unit, a list selecting unit, a block selecting unit, a writing unit, and an updating unit. The managing unit holds for each of storage areas of the nonvolatile memory a free block list indicating free blocks. The order rule holding unit holds an order rule used to determine an order of the free block lists. The position information storing unit stores position information indicating the position of the free block list in the order rule. The list selecting unit selects the free block list corresponding to the position indicated by the position information and the block selecting unit selects the free block therefrom. The updating unit updates after the list selection the position information in the position information storing unit with position information indicating the position of the subsequently selected free block list.

9 Claims, 20 Drawing Sheets

WRITE DATA OF ADDRESS A1 IN BLOCK B2

FIG.12A
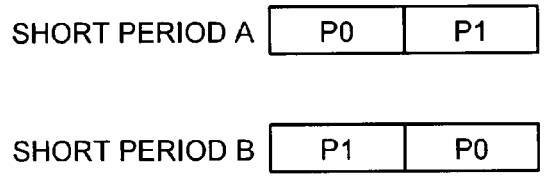
SHORT PERIOD A | P0 | P1
SHORT PERIOD B | P1 | P0
FIG.12B
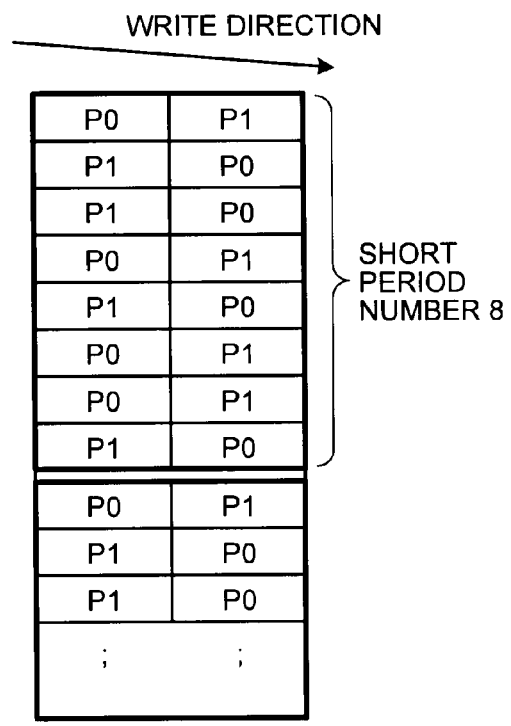
FIG.12C
ORDER RULE={ P0,P1, P1,P0, P1,P0, P0,P1,
P1,P0, P0,P1, P0,P1, P1,P0 }

SHORT PERIOD A: | P0 | P1 |

SHORT PERIOD B: | P1 | P0 |

ORDER RULE={ 0,1, 1,0, 1,0, 0,1, 1,0, 0,1, 0,1, ···}

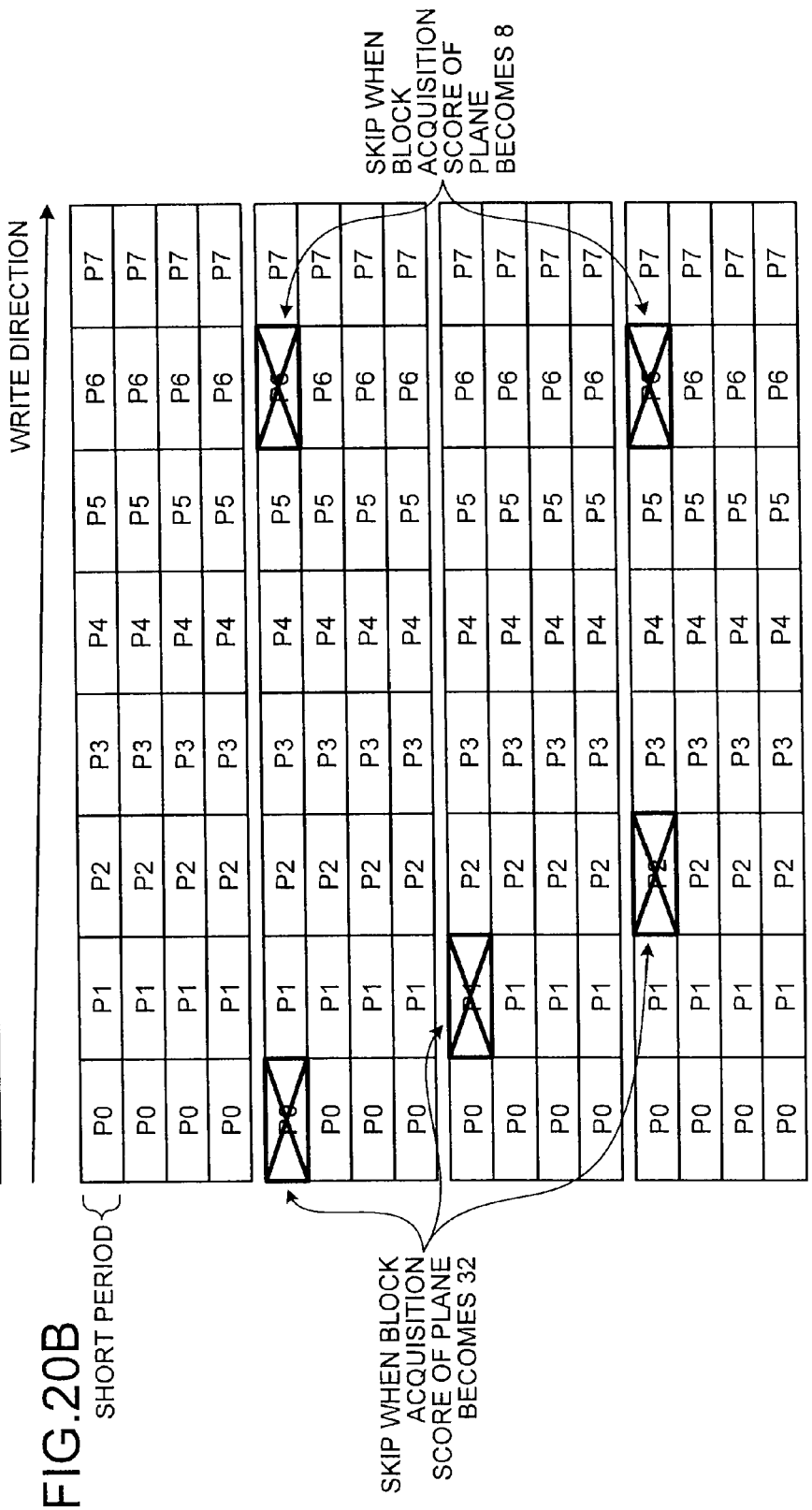

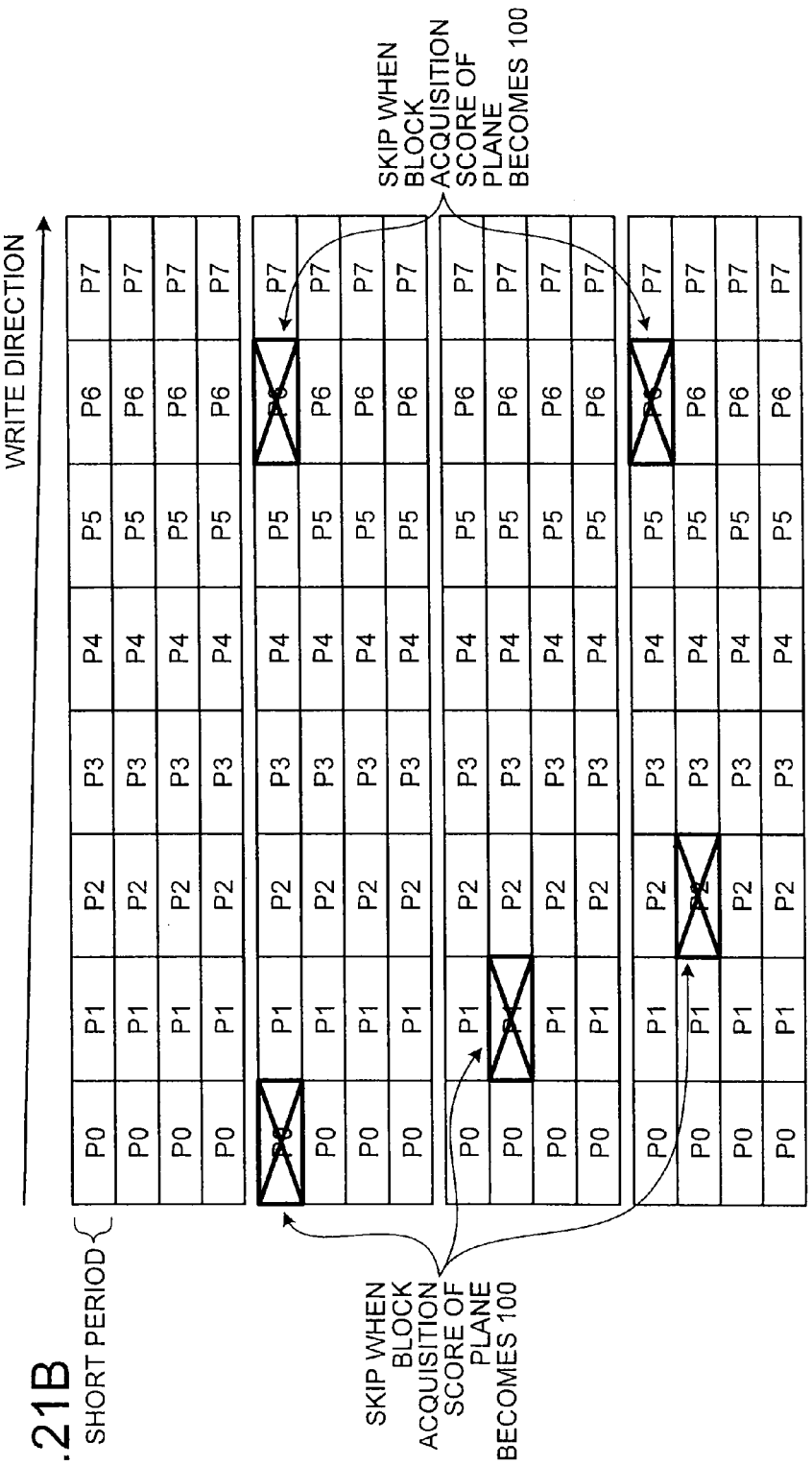

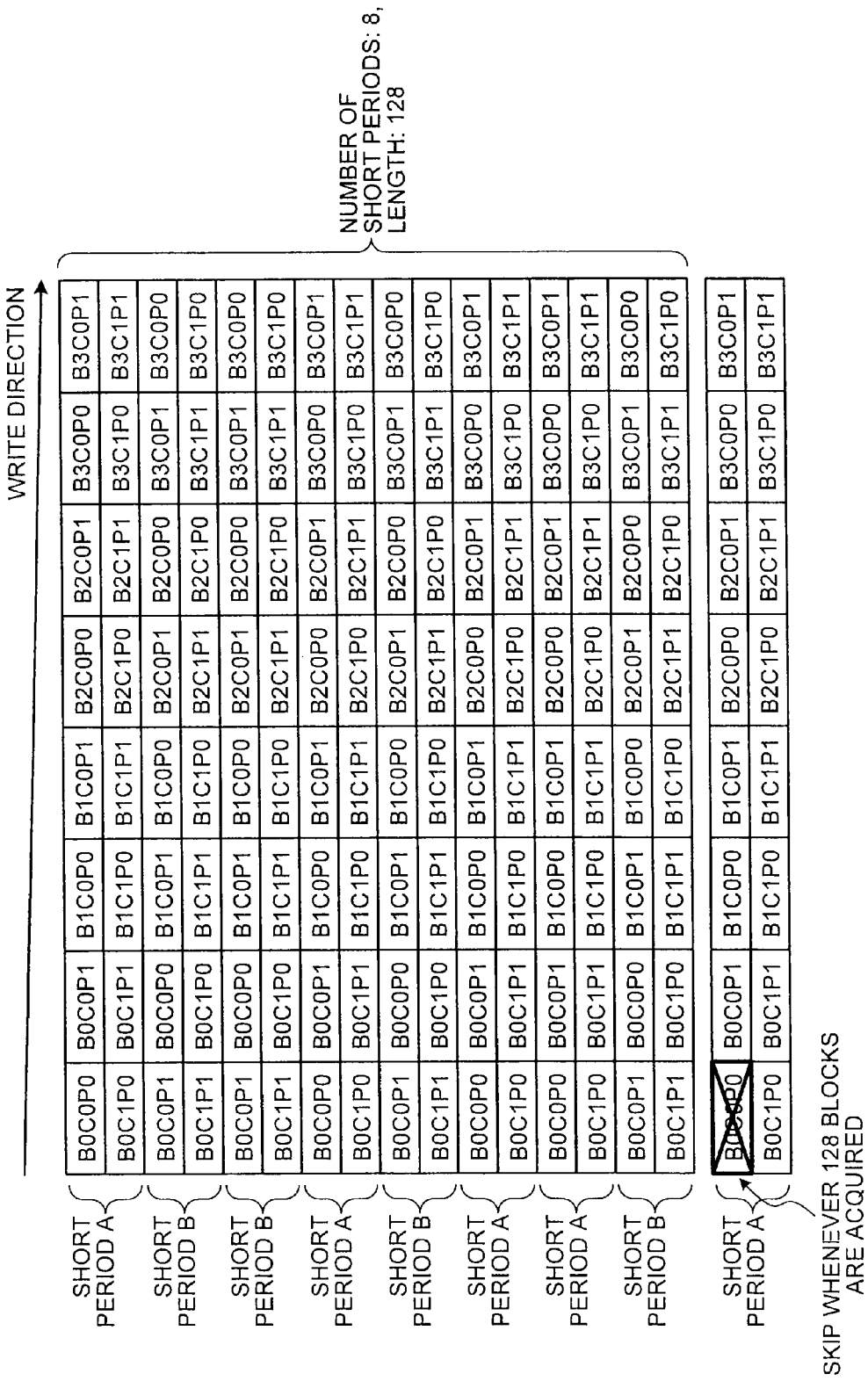

MEMORY SYSTEM

CROSS-REFERENCE TO RELATED APPLICATIONS

This application is based upon and claims the benefit of priority from Japanese Patent Application No. 2010-43299, filed on Feb. 26, 2010; the entire contents of which are incorporated herein by reference.

FIELD

Embodiments described herein relate generally to a memory system that includes a nonvolatile semiconductor memory.

BACKGROUND

As an external storage device that is used in a computer, a solid state drive (SSD) that uses a nonvolatile semiconductor memory, such as a NAND flash memory, as a storage medium has attracted attention. Since the SSD does not include a mechanical operation, the SSD is superior to a conventionally used magnetic disk device, in terms of shock resistance, a random read operation, and power consumption.

Meanwhile, a write speed of the NAND flash memory is lower than a write speed of the magnetic disk device. Thus, plural chips of the NAND flash memory in the SSD are connected to enable an access in parallel, and the NAND flash memory itself is configured to enable a simultaneous write operation in plural areas in the chips, so that transfer performance is improved.

In order to improve a practical data transfer speed of the SSD, making full use of the parallelism of hardware that is configured as described above is required. For this reason, a buffer memory that temporarily accumulates write data received from a host is prepared, the data is divided after the sufficient amount of data is accumulated in the buffer memory, and the data is written in the plural chips of the NAND flash memory in parallel.

The storage area of the NAND flash memory is divided into units called blocks, and a data erase operation with respect to the NAND flash memory is performed in a block unit. That is, the data write operation with respect to the NAND flash memory is performed by collectively erasing data in blocks and writing new data in corresponding blocks in a predetermined order.

Meanwhile, the NAND flash memory has a characteristic such that a maximum erase count is restricted. For example, if an erase count of an arbitrary block becomes equal to or more than a predetermined value, the block is exhausted and the probability of data storage failure increases. If the number of blocks where data cannot be stored due to the exhaustion increases, the entire data storage capacity of the SSD decreases and the SSD becomes failed when the predetermined declared capacity cannot be provided. In order to increase the lifespan of the SSD as a whole, a mechanism that equally uses all blocks and equalizes an erase count of each block is needed.

As described above, in order to practically use the SSD, it is needed to exploit parallelism at the time of an access, particularly, at the time of a write operation, to maintain transfer performance and equalize erase counts between the blocks. A block allocating method that selects a block where data is written is important for the securing parallelism at the time of writing data and the equalizing erase counts between the blocks.

For example, as in a hard disk, if a method that fixedly allocates a physical storage area to each address is applied to the SSD, a block is fixedly allocated to each address in the SSD. In this case, however, the following two problems are caused.

The first problem is caused when data written in a block corresponding to a specific address is repetitively overwritten. Because collective data erasing and writing are repeated in the block corresponding to the address, an erase count of only the corresponding block increases and the lifespan of the corresponding block becomes shorter than those of the other blocks.

The second problem is caused when plural write data is received for addresses allocated to one or more blocks at each of which parallel write is disabled. In this case, data is sequentially written in the individual blocks and transfer performance is deteriorated.

BRIEF DESCRIPTION OF THE DRAWINGS

FIGS. 12A to 12C are schematic diagrams showing an example in which short periods are arranged and a new order rule is generated;

FIGS. 20A and 20B are schematic diagrams showing an example in which the order rule of the second method of the third embodiment is skipped;

FIGS. 21A and 21B are schematic diagrams showing another example in which the order rule of the second method of the third embodiment is skipped; and FIG. 22 is a schematic diagram showing an example of an order rule according to a modification of the third embodiment.

DETAILED DESCRIPTION

In general, according to one embodiment, a memory system includes a nonvolatile memory, a managing unit, an order rule holding unit, a position information storing unit, a list selecting unit, a block selecting unit, a writing unit, and an updating unit. The nonvolatile memory includes a plurality of storage areas each including a plurality of blocks, each of which is a data erase unit. The nonvolatile memory is configured such that parallel write is enabled with respect to the blocks included in the different storage areas. The managing unit holds, for each of the storage areas, a free block list indicating free blocks that are the blocks where valid data is not stored. The order rule holding unit holds an order rule that is information used to determine an order of the free block lists. The position information storing unit stores position information indicating the position of the free block list in the order rule. The list selecting unit selects the free block list corresponding to the position indicated by the position information. The block selecting unit selects the free block from the free block list selected by the list selecting unit. The writing unit writes data in the free block selected by the block selecting unit. The updating unit updates, after the free block list is selected by the list selecting unit, the position information stored in the position information storing unit with position information indicating the position of the subsequently selected free block list.

<Configuration Common to Each Embodiment>

Figure 1:
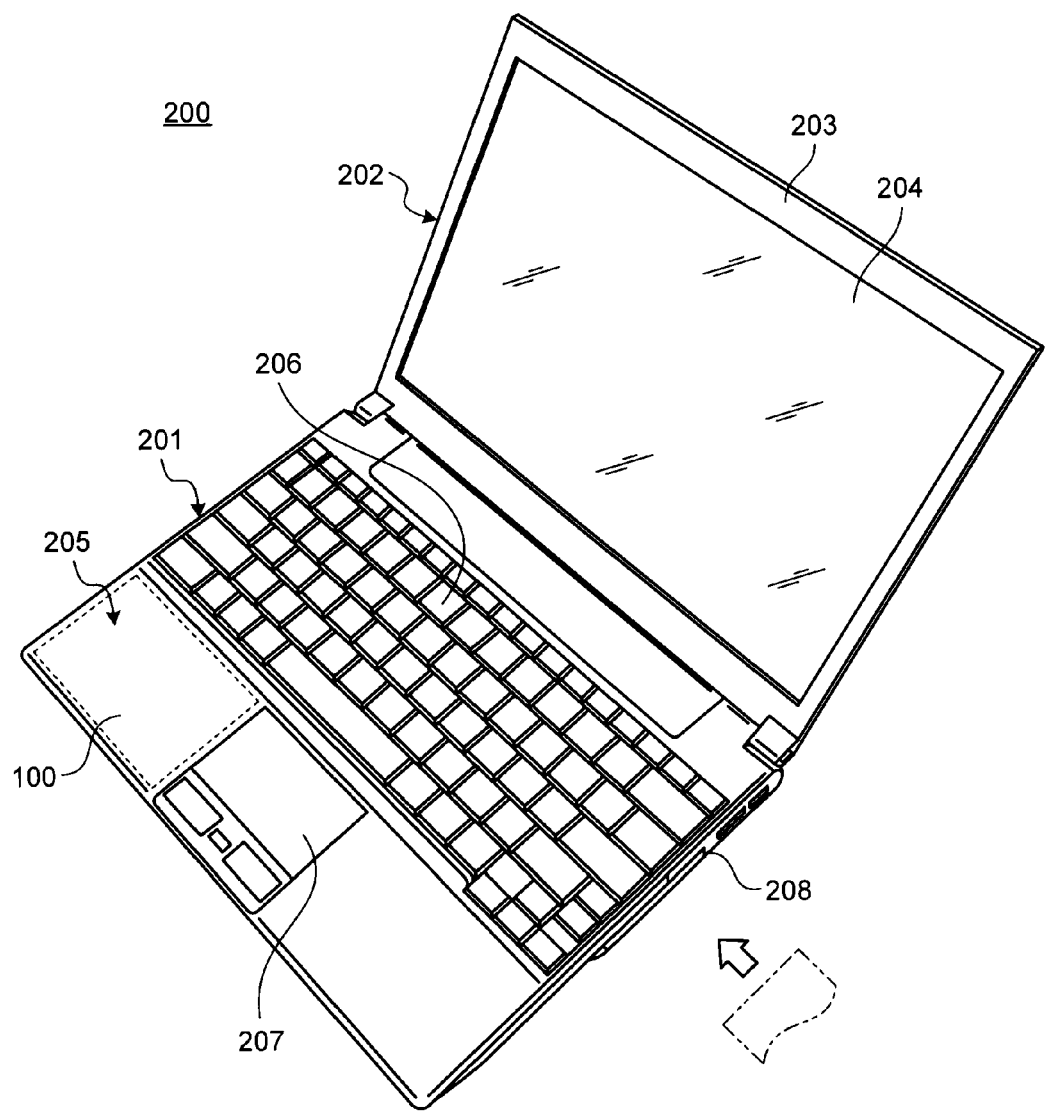
FIG. 1 is a schematic diagram showing an example of a computer to which a memory system according to each embodiment can be applied.

Hereinafter, embodiments of a memory system will be described in detail with reference to the drawings. However, the invention is not limited to the embodiments. FIG. 1 shows an external appearance of an example of a computer 200 to which a memory system according to each embodiment can be applied. The computer 200 that is exemplified in FIG. 1 is a so-called portable computer that is configured to have a small size and light weight to be portable. The computer 200 includes a body 201 and a display unit 202. The display unit 202 includes a display housing 203 and a display device 204 that is stored in the display housing 203.

The body 201 includes a casing 205, a keyboard 206, and a touch pad 207 that corresponds to a pointing device. In the casing 205, a main circuit board, an optical disk drive (ODD) unit, a card slot, and a solid state drive (SSD) 100 are stored. The main circuit board is mounted with main components of the computer 200, such as a central processing unit (CPU), a read only memory (ROM), and a random access memory (RAM). The ODD unit performs a data read/write operation on an optical disk, such as a compact disk (CD) or a digital versatile disk (DVD).

The card slot is provided to be adjacent to a peripheral wall of the casing 205. On the peripheral wall, an opening 208 that faces the card slot is provided. A user can insert an added device into the card slot from the outside of the casing 205, through the opening 208.

The SSD 100 is a storage device that uses a rewritable nonvolatile semiconductor memory. The SSD 100 can be used in a state where the SSD is mounted in the computer 200, to store an operating system (OS) or various programs, instead of a conventional hard disk drive (HDD). However, not limited thereto, the SSD 100 may be used as an added device, in a state where the SSD is inserted into the card slot included in the computer 200.

Figure 2:
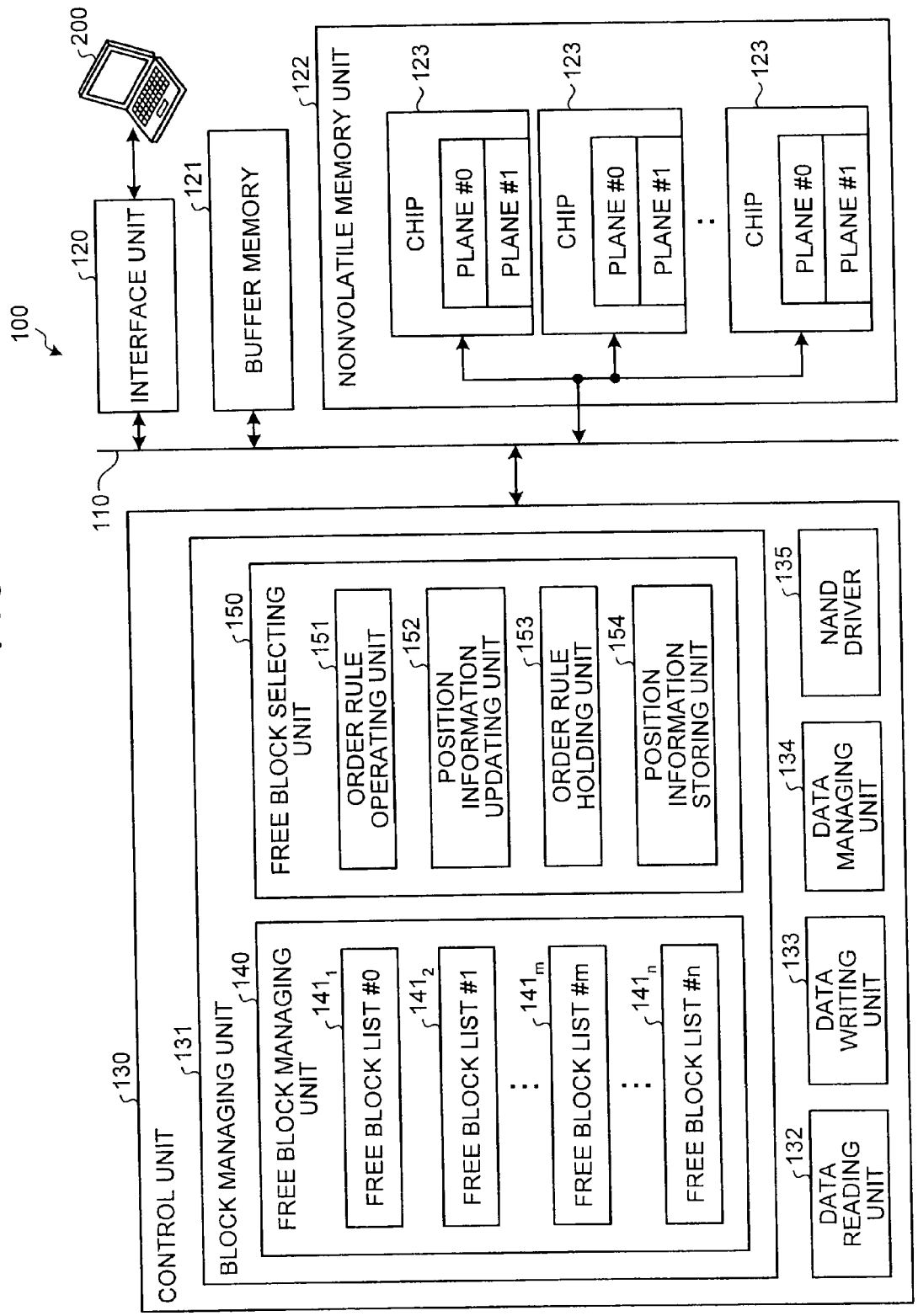
FIG. 2 is a block diagram showing an example of the configuration of an SSD that can be applied to each embodiment.

FIG. 2 shows the configuration of an example of the SSD 100 that can be applied to each embodiment. Schematically, the SSD 100 has a control unit 130, an interface unit 120, a buffer memory 121, and a nonvolatile memory unit 122. The control unit 130, the interface unit 120, the buffer memory 121, and the nonvolatile memory unit 122 are configured to be connected to a signal line, such as a bus 110, and exchange data with each other.

The interface unit 120 communicates with a host apparatus. In the example of FIGS. 1 and 2 described above, the computer 200 is connected as the host apparatus. Hereinafter, the computer 200 is described as the host apparatus 200. The interface unit 120 receives a read, write or a flash command from the host apparatus 200 and notifies the control unit 130 of reception of the command. The interface unit 120 exchanges data with the host apparatus 200, according to an instruction from the control unit 130.

The buffer memory 121 is composed of a volatile memory, such as a dynamic RAM (DRAM). The buffer memory 121 temporarily stores data that is exchanged between the interface unit 120 and the host apparatus 200 or data that is read from or written in the nonvolatile memory unit 122. However, not limited thereto, a variety of management information in the SSD 100 may be stored in the buffer memory 121.

The nonvolatile memory unit 122 is a memory in which data is rewritable and stored contents are not erased even though supply of power is stopped. For example, user data that is transmitted from the host apparatus 200 is stored in the nonvolatile memory unit 122. However, not limited thereto, the nonvolatile memory unit 122 may store the variety of management information in the SSD 100, in addition to the user data.

Figure 3A:
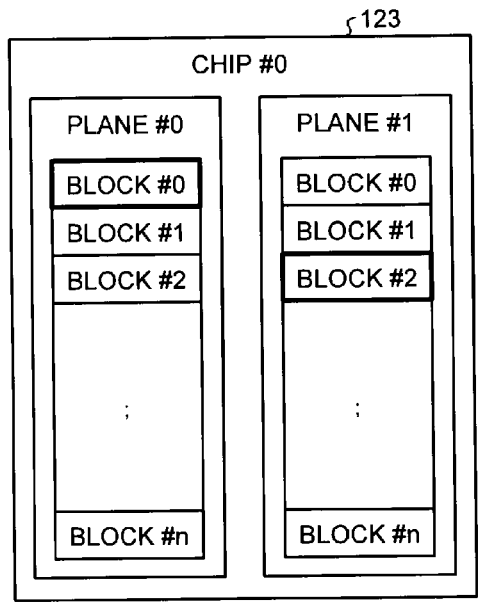
FIGS. 3A and 3B are diagrams specifically showing the configuration of an example of a chip.
Figure 3B:
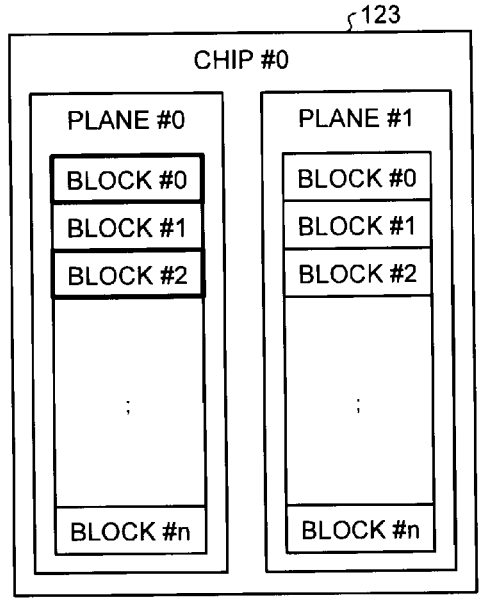

The nonvolatile memory unit 122 has chips 123 of a NAND flash memory that is a nonvolatile memory storage medium and a NAND controller (not shown in the drawings) that controls the NAND flash memory. Each of the chips 123 can have plural planes that are storage areas where independent access control is enabled. FIGS. 3A and 3B specifically show the configuration of an example of the chip 123 of the nonvolatile memory unit 122. In this example, the chip 123 has two planes of a plane #0 and a plane #1 and each plane has plural blocks #0, #1, . . . , and #n that have predetermined storage capacities.

The block that is a physical block functioning as a physical storage area in the chip 123 is a data erase unit of the chip 123. The plural physical blocks may be collected and handled as one logical block. In this case, the logical block becomes a data erase unit. Hereinafter, the physical block and the logical block are simply referred to as a block without distinguishing the physical block and the logical block from each other.

When data is written in an arbitrary block of the chip 123, data is erased from the corresponding block in a block unit and new data is written in the corresponding block. Accordingly, a data writing operation with respect to the chip 123 is substantially performed in the block unit.

In the chip 123 of the NAND flash memory, the planes are configured such that an access is enabled in the chip in parallel. For example, as exemplified in FIG. 3A, in the chip 123 where a number #0 is given, a parallel access is enabled to the block #0 belonging to the plane #0 and the block #2 belonging to the plane #1. Meanwhile, as exemplified in FIG. 3B, in the chip 123 of the same number #0, a parallel access is disabled to the block #0 and the block #2 belonging to the plane #0.

In the NAND flash memory, as the total storage capacity, the storage capacity that is more than the storage capacity provided to the host apparatus 200 is prepared. Thus, at an arbitrary point of time, a block where valid data is stored and a block where valid data is not stored exist. The block where the valid data is not stored is called a free block. The block where the valid data is stored is called an active block.

Referring back to FIG. 2, the control unit 130 has individual functions of a block managing unit 131, a data reading unit 132, a data writing unit 133, a data managing unit 134, and a NAND driver 135. The control unit 130 controls communication with the host apparatus 200 through the interface unit 120 or controls management or read/write of data stored in the buffer memory 121 and the nonvolatile memory unit 122.

The individual functions of the control unit 130 can be configured as a SoC (System On a Chip) embedded as a circuit. However, not limited thereto, a general-purpose processor may be used as hardware of the control unit 130 and these functions may be realized as software operated on the general-purpose processor.

In the control unit 130, the data managing unit 134 manages a correspondence relationship between an address indicating a storage position of data, that is used between the host apparatus 200 and the data managing unit, and a block position that is an actual storage area in the nonvolatile memory unit 122. The address is an address that is used between the host apparatus 200 and the SSD 100. The address and the block are dynamically associated when data is written.

An association between the address and the block in the data managing unit 134 will be described using FIGS. 4A and 4B. For example, as exemplified in FIG. 4A, it is assumed that addresses of data designated by the host apparatus 200 are addresses A0, A1, . . . and block positions of a certain plane in the nonvolatile memory unit 122 are blocks B0, B1, . . . . Further, it is assumed that a size of data designated by one address is equal to the storage capacity of one block.

Here, the case where valid data is stored in a block corresponding to the address A1 and a storage area actually used as the address A1 in the nonvolatile memory unit 122 is the block B1 is considered. In this case, the block B1 is an active block and the block B2, for example, that is adjacent to the block B1 is a free block.

Figure 4A:
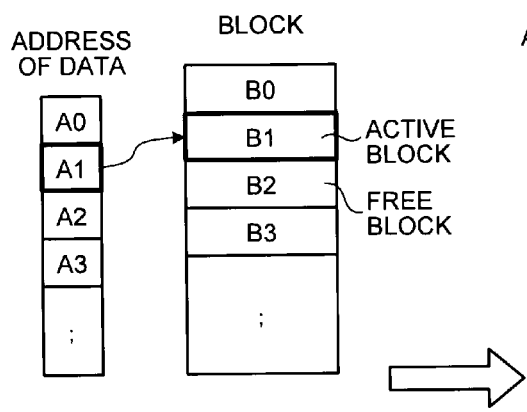
FIGS. 4A and 4B are schematic diagrams illustrating an association between addresses and blocks.

In a state of FIG. 4A, it is assumed that a command instructing to overwrite data of the address A1 is received from the host apparatus 200. When the data of the same address is overwritten, a data overwriting process is executed in a block unit. The data managing unit 134 allocates one free block (for example, block B2) and writes the data received from the host apparatus 200 in the allocated free block. After writing the data with respect to the free block, the data managing unit 134 associates the address A1 designated by the host apparatus 200 and the block B2 where data is actually written.

Figure 4B:
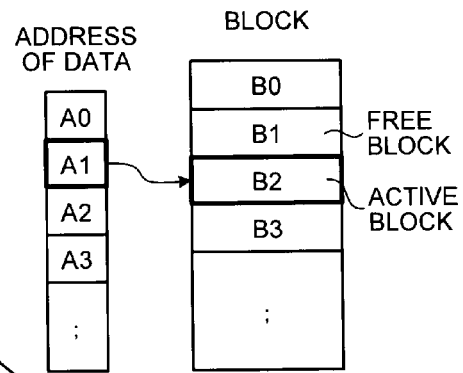

As a result, as exemplified in FIG. 4B, the block B2 becomes an active block. In the block B1 where the data of the address A1 is stored before overwriting, since the stored data becomes invalid, the block B1 becomes a free block. As described above, in the SSD, even though the data is the data designated as the same address A1, the block that is used as the actual storage area changes whenever data is written.

Referring back to FIG. 2, the data reading unit 132 controls reading of data from the nonvolatile memory unit 122. The data writing unit 133 controls writing of data with respect to the nonvolatile memory unit 122. The NAND driver 135 controls a NAND controller (not shown in the drawings) of the nonvolatile memory unit 122 to read data from or write data in the nonvolatile memory unit 122, according to a request of the data reading unit 132 or the data writing unit 133.

The block managing unit 131 has a free block managing unit 140 and a free block selecting unit 150, and manages free blocks in the nonvolatile memory unit 122 and selects a free block used when data is written. The free block managing unit 140 holds and manages a free block list that is information indicating free blocks corresponding to blocks where valid data is not stored. For example, the free block managing unit 140 holds free block lists $141_0, 141_1, \ldots, 141_m, \ldots,$ and $141_n$ for respective planes, which are structures for managing the free blocks of the nonvolatile memory unit 122. The free blocks of the nonvolatile memory unit 122 are managed by the free block managing unit 140, on the basis of the free block list $141_m$ corresponding to the plane to which the corresponding free blocks belong.

It is assumed that the free block list $141_m$ indicates an arbitrary free block list among the free block lists $141_0$ to $141_n$ managed by the free block managing unit 140.

The free block list $141_m$ may take a form in which block information including a block identifier corresponding to each free block as a node is linked with each free block list. With regard to the order of linking the free blocks with the free block list, a simple FIFO (First In First Out) may be used or the free blocks may be linked in order in which the free blocks are sorted according to erase counts of the free blocks. With regard to plural planes where parallel write is disabled, free blocks may be collected in one free block list and the free blocks may be managed.

The free block selecting unit 150 selects free blocks of the nonvolatile memory unit 122 according to an order rule, when data is written in the nonvolatile memory unit 122. The free block selecting unit 150 has an order rule operating unit 151, a position information updating unit 152, an order rule holding unit 153, and a position information storing unit 154.

The order rule holding unit 153 holds the order rule. The order rule is information that is used to determine the orders of the free block lists, and is defined by a table format or an operation format. Alternatively, the order rule may be defined by formats other than the table format and the operation format. The order rule holding unit 153 may be configured by a portion of a storage device or a storage area (not shown in the drawings). The order rule operating unit 151 operates an order sequence on the basis of the order rule. The order sequence is information that indicates the orders of the free block lists generated on the basis of the order rule. For example, the order sequence is information where identifiers of the free block lists are arranged in order. The free block list is selected on the basis of the order sequence and position information to be described below.

The position information storing unit 154 stores position information. The position information is information that indicates positions on the order sequence when the order sequence of the free block lists is generated according to the order rule. That is, the position information is information that indicates the orders of the free block lists determined on the basis of the order rule. The position information updating unit 152 updates the position information that is stored in the position information storing unit 154. For example, the position information updating unit 152 updates the position information with position information indicating the subsequently selected free block list, after the free block list is selected by the order rule operating unit 151.

Figure 5:
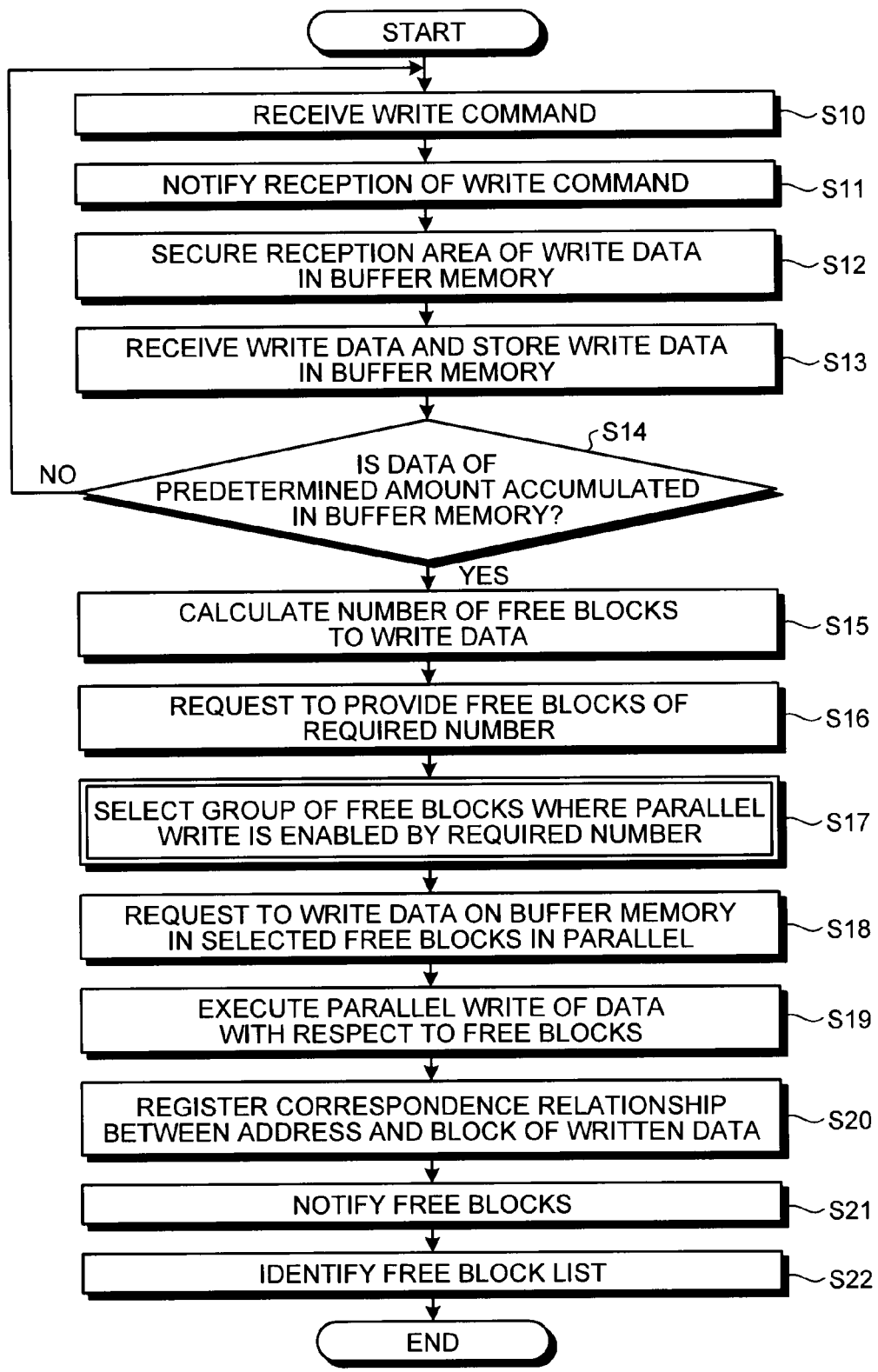
FIG. 5 is a flowchart showing an example of a data writing process according to each embodiment.

Next, a data writing process according to each embodiment will be schematically described using a flowchart of FIG. 5. In each embodiment, write data that is received from the host apparatus 200 is temporarily stored in the buffer memory 121 when data is written. After the sufficient amount of data is stored in the buffer memory 121, the write data is read from the buffer memory 121 and is written in the plural free blocks in parallel.

In FIG. 5, if the interface unit 120 waits for a write command from the host apparatus 200 and receives the write command (step S10), the interface unit 120 notifies the control unit 130 of reception of the write command (step S11). The write command includes information that indicates a write address of the write data.

After receiving the notification of the reception of the write command, the data writing unit 133 of the control unit 130 allocates an area to receive the write data transmitted from the host apparatus 200, on the buffer memory 121, in a next step S12. The data writing unit 133 instructs the interface unit 120 to receive the write data transmitted from the host apparatus 200 in the area allocated on the buffer memory 121. In a next step S13, the interface unit 120 receives the write data transmitted from the host apparatus 200 and stores the received write data in the area allocated on the buffer memory 121 in step S12.

In a next step S14, the data writing unit 133 confirms the amount of write data that is stored in the buffer memory 121, and determines whether the predetermined amount of write data is stored in the buffer memory 121. When it is determined that the amount of write data stored in the buffer memory 121 is less than the predetermined amount, the process is returned to step S10 and the data writing unit 133 waits for a command from the host apparatus 200.

Meanwhile, when it is determined in step S14 that the predetermined amount of write data is stored in the buffer memory 121, the process proceeds to step S15. In step S15, the data writing unit 133 calculates the number of free blocks that are needed to write the write data stored in the buffer memory 121.

In a next step S16, the data writing unit 133 requests the free block managing unit 140 to provide the free blocks of the required number calculated in step S15. When the data writing unit 133 requests the free block managing unit 140 to provide the free blocks, the process proceeds to step S17 that is a characteristic of each embodiment. In step S17, the free block managing unit 140 receives the request from the data writing unit 133 and extracts a group of free blocks of the required number where parallel write is enabled, from the free block lists $141_0, 141_1, \ldots, 141_m, \ldots$, and $141_n$. The free block managing unit 140 returns information indicating the extracted free blocks to the data writing unit 133.

In a next step S18, the data writing unit 133 requests the NAND driver 135 to write the write data on the buffer memory 121 in the free blocks indicated by the information acquired from the free block managing unit 140 in parallel. In a next step S19, the NAND driver 135 controls a NAND controller (not shown in the drawings) of the nonvolatile memory unit 122 and executes parallel write of the write data that is requested from the data writing unit 133.

If the write data is written in the free blocks in step S19, the data writing unit 133 registers a correspondence relationship between addresses and blocks of the written data in the data managing unit 134, in a next step S20. In a next step S21, the data managing unit 134 notifies the free block managing unit 140 of active blocks, which have been associated with the addresses where the write of the write data is instructed until the registration, i.e., until the writing in the step S19, as free blocks.

In a next step S22, the free block managing unit 140 identifies the free block list $141_m$ corresponding to the plane to which the free blocks notified from the data managing unit 134 in step S21 belong, and links the free blocks notified from the data managing unit 134 with the identified free block list $141_m$.

First Embodiment

Next, a first embodiment will be described. Hereinafter, a free block selecting process (step S17 of FIG. 5) that is a characteristic of the first embodiment will be described in detail.

When the free block managing unit 140 selects a group of free blocks where parallel write is enabled, the free block managing unit 140 selects the free block list $141_m$ from the free block lists $141_0, 141_1, \ldots, 141_m, \ldots$, and $141_n$ managed by the free block managing unit 140, according to the predetermined order rule, and acquires the free blocks from the selected free block list $141_m$.

The order rule is preferably a rule in which a group of free blocks where parallel write is enabled can be obtained, if the free block list $141_m$ is selected from the free block lists $141_0, 141_1, \ldots, 141_n, \ldots$, and $141_n$, in the order shown by the order sequence operated on the basis of the order rule.

Figure 6:
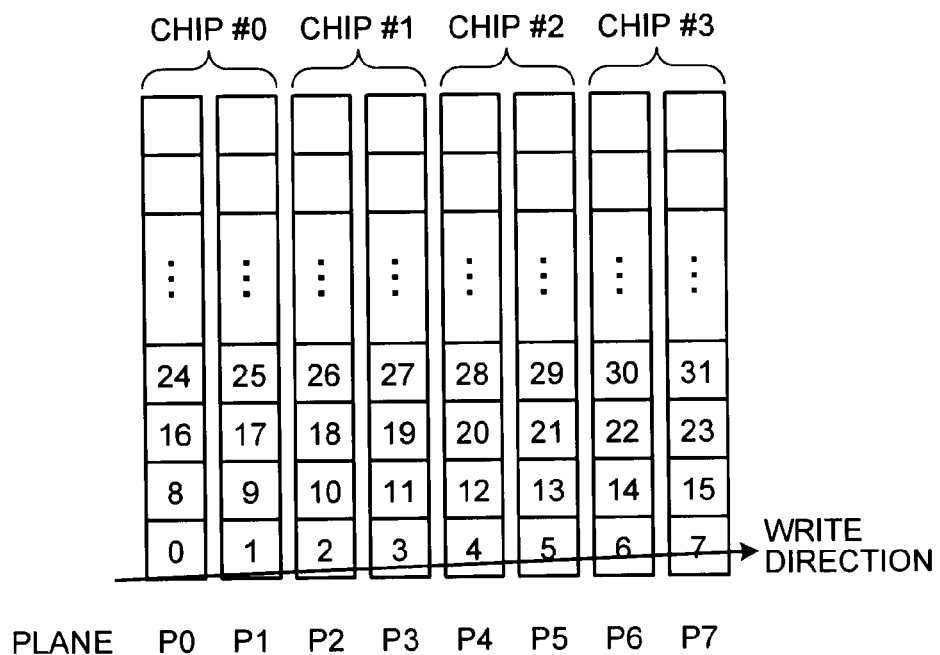
FIG. 6 is a schematic diagram illustrating an order rule.

For example, as shown in FIG. 6, the case where the number of chips of the nonvolatile memory unit 122 is 4 and the number of planes in each of the chips #0 to #3 is 2 is considered. In this case, a total of eight planes P0 to P7 exist and parallel write is enabled in the eight planes. If one free block is selected from each plane, a maximum of 8 parallel write is enabled.

In FIG. 6, each rectangle shows a block and a figure in each rectangle indicates an address that is dynamically associated with the block. In FIG. 6, an arrow shows a write direction of data with respect to the blocks or a free block acquiring direction. This is applicable to the drawings to be described below, as long as a specific mention is not given.

For example, identifiers "0" to "7" are associated with the free block lists $141_m, 141_{m+1}, \ldots, 141_{m+7}$ corresponding to the planes P0 to P7, the identifiers are arranged in predetermined order, and an order rule that is represented by a sequence of the identifiers and has the length 8 is generated as shown by an expression 1. The order rule is previously generated and is held in an order rule table 153.

$$\{0, 1, 2, 3, 4, 5, 6, 7\} \quad (1)$$

If the order rule shown in the expression 1 is cyclically repeated, the free blocks where a maximum of 8 parallel write is enabled can be selected, even though the free block list starts to be selected from an arbitrary position. For example, when the free block list starts to be selected from the position indicated by the identifier "4" on the order rule, as shown by an expression 2, the free block list may start to be selected from the position of the identifier "4", the selection position may cyclically return from the position of the identifier "7" to the position of the identifier "0", and the free block lists may be sequentially selected until the position of the identifier "3".

$$\{4, 5, 6, 7, 0, 1, 2, 3\} \quad (2)$$

Next, the case where restrictions are imposed on a group of planes where parallel write is enabled is considered. In this case, an order rule may be generated such that the distance on the order sequence under the order rule between the planes where parallel write is disabled is away as far as possible.

Figure 7:
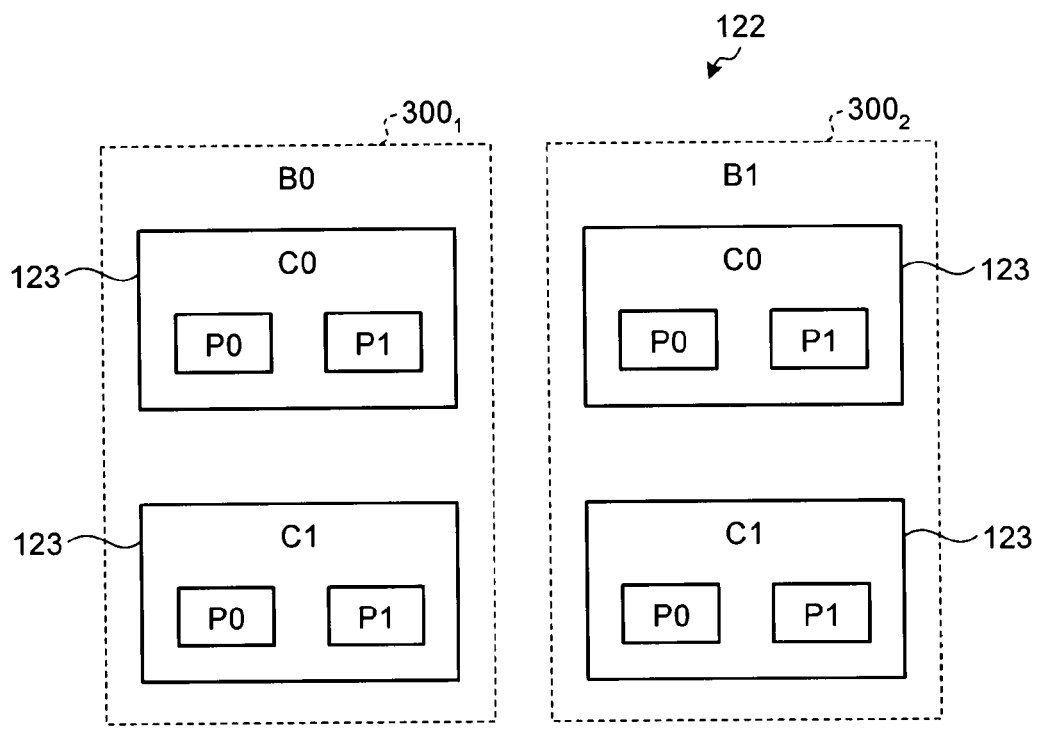
FIG. 7 is a schematic diagram showing the bank-chip-plane configuration.

For example, as shown in FIG. 7, the case where the number of chips of the nonvolatile memory unit 122 is 4, the number of planes in each of the chips 123 is 2, and the chips 123 are grouped two by two to configure two banks $300_1$ (bank B0) and $300_2$ (bank B1) is considered. Hereinafter, this configuration is called the bank-chip-plane configuration. In the bank-chip-plane configuration, restrictions are imposed on the chips belonging to the same bank in that parallel write is disabled. Accordingly, in this case, maximum parallelism, that is, the maximum number of blocks where parallel write is enabled becomes 4.

In FIG. 7, the chips 123 are distinguished as the chips C0 and C1 in each bank, and the planes in each of the chips 123 are distinguished as the planes P0 and P1.

In FIG. 7, each plane is represented as "B (bank number) C (chip number in the bank) P (plane number in the chip)". For example, the plane P0 in the chip C0 that belongs to the bank B0 is represented as "B0C0P0". It is considered to generate an order rule shown by the following expression 3. In the order rule shown by the expression 3, a maximum of 4 parallel write is realized by selecting one chip in each bank.

$$\{B0C0P0, B0C0P1, B1C0P0, B1C0P1, B0C1P0, B0C1P1, B1C1P0, B1C1P1\} \quad (3)$$

In the order rule shown in the expression 3, when the free blocks start to be acquired from the plane P0, the free blocks can be acquired to enable a maximum of 4 parallel write. For example, when the free blocks start to be acquired from the plane B1C0P0, the free blocks can be acquired in order of the plane B1C0P0, the plane B1C0P1, the plane B0C1P0, and the plane B0C1P1.

Meanwhile, when the free blocks start to be acquired from the plane P1, the free blocks where only 3 parallel write is enabled can be acquired. For example, when the free blocks start to be acquired from the plane B0C0P1, parallel write is enabled in the free blocks that are acquired in order of the plane B0C0P1, the plane B1C0P0, and the plane B1C0P1. Since the next plane B0C1P0 is a plane of the different chip in the same bank as the plane B0C0P1 from which the free blocks start to be selected, parallel write is disabled in the free blocks belonging to the plane B0C1P0 and the free blocks acquired from the plane B0C0P1.

As in the case where restrictions are imposed on the group of the planes where parallel write is enabled, the order rule may not become an order rule where the free blocks can be acquired with maximum parallelism at all times.

Figure 8:
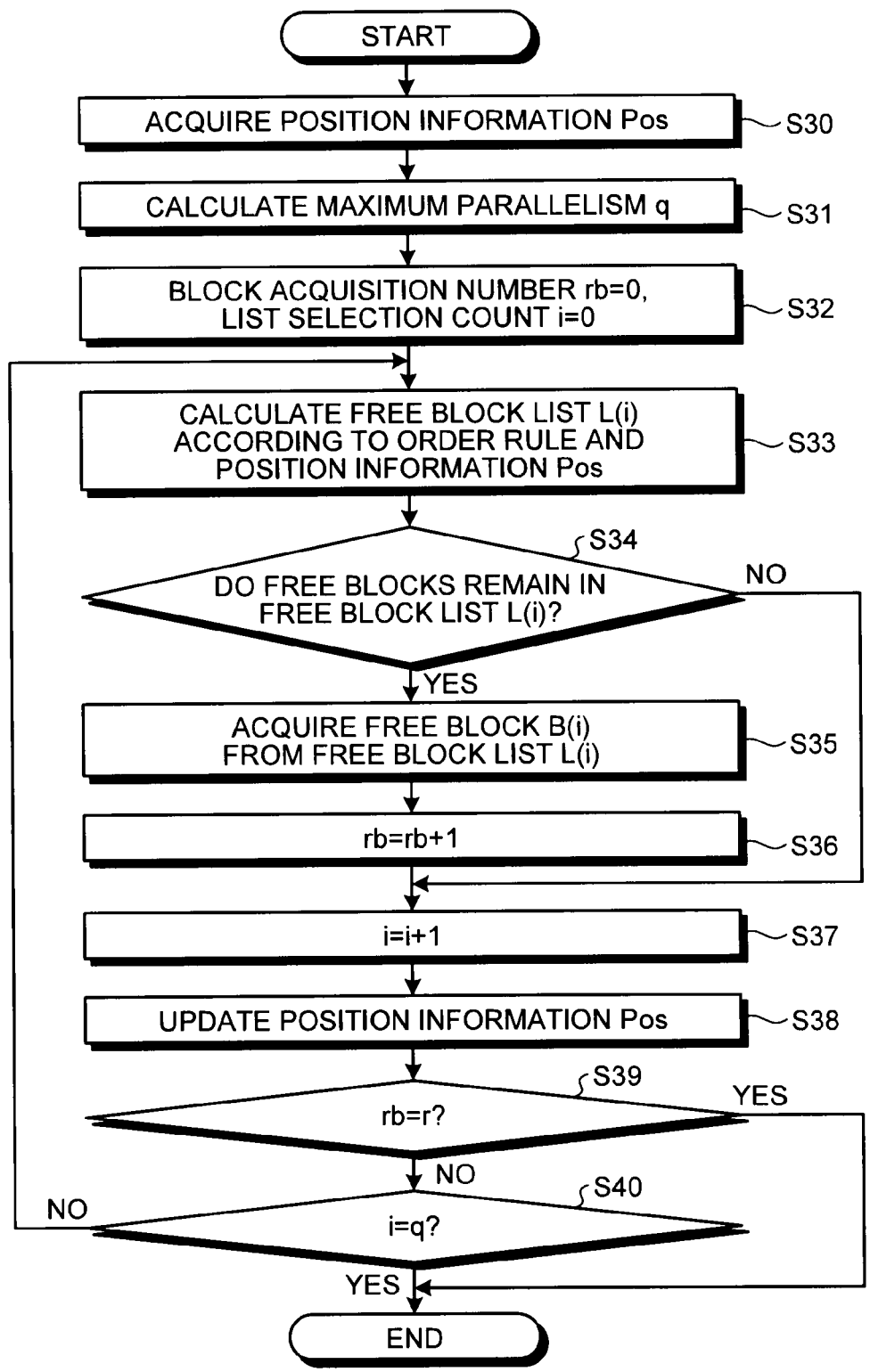
FIG. 8 is a flowchart showing an example of a selecting process of a free block where parallel write is enabled.

Next, a free block acquiring process according to the first embodiment will be described in detail. FIG. 8 is a flowchart showing a selecting process of the free blocks where parallel write is enabled by the block managing unit 131. The process according to the flowchart of FIG. 8 corresponds to the process of step S17 in the flowchart of FIG. 5 described above. In the description below, it is assumed that the free blocks of the required number r are required from the data writing unit 133, in step S16 of FIG. 5. Further, it is assumed that the order rule is previously determined as the predetermined order rule.

First, the block managing unit 131 acquires position information Pos from the position information storing unit 154 (step S30), and calculates maximum parallelism q at the time when the free blocks start to be selected from the free block list $141_m$ of the position indicated by the acquired position information Pos (step S31).

The maximum parallelism q depends on the restrictions imposed on the group of planes where parallel write described above is enabled and the starting position of the free block selecting process. That is, the maximum parallelism q depends on the configuration of the chips 123 in the nonvolatile memory unit 122 or the operation of the chips 123 based on the banks.

Information on the restrictions or the operations can be previously stored in a ROM (Read Only Memory) (not shown in the drawings) of the block managing unit 131 or the nonvolatile memory unit 122. However, not limited thereto, when the restrictions or the operations can be dynamically set from the side of the host apparatus 200, the restrictions or the operations may be provided from the host apparatus 200 through the interface unit 120. The block managing unit 131 calculates the maximum parallelism q, on the basis of the position information Pos and information indicating the restrictions or the operations.

In a next step S32, each of a block acquisition number rb and a list selection count i is initialized to 0, and the process proceeds to step S33.

In step S33, the block managing unit 131 delivers the position information Pos to the order rule operating unit 151. The order rule operating unit 151 selects one free block list $141_m$ corresponding to the list selection count i from the free block lists $141_1, 141_2, \ldots, 141_m, \ldots,$ and $141_n$ managed by the free block managing unit 140, according to the position information Pos and the predetermined order rule held in the order rule table 153. Hereinafter, the free block list $141_m$ corresponding to the list selection count i is described as a free block list L(i), as long as a specific mention is not given. The selected free block list L(i) is returned to the block managing unit 131.

The block managing unit 131 checks whether the free blocks remain in the free block list L(i) returned from the order rule operating unit 151. When it is determined that the free blocks do not remain in the free block list L(i), the process proceeds to step S37. In this case, the free blocks cannot be acquired from the free block list L(i).

Meanwhile, in step S34, when it is determined that the free blocks remain in the free block list L(i), the process proceeds to step S35. In step S35, the free block selecting unit 150 selects a free block B(i) from the free block list L(i). The block managing unit 131 acquires the selected free block B(i). In a next step S36, the block managing unit 131 increases the block acquisition number rb by 1. In a next step S37, the free block selecting unit 150 increases the list selection count i by 1 and counts the list selection count.

In a next step S38, the position information updating unit 152 updates the position information Pos, which is held in the position information storing unit 154, with position information Pos indicating a next position on the order sequence based on the order rule. At this time, when the next position is out of a final position on the order sequence based on the order rule, the position information updating unit 152 sets the next position to a head of the order sequence based on the order rule.

The process proceeds to step S39 and the block managing unit 131 determines whether the block acquisition number rb reaches the free block required number r. When it is determined that the block acquisition number rb reaches the free block required number r, a series of processes based on the flowchart of FIG. 8 ends and the process proceeds to step S18 of FIG. 5.

Meanwhile, when it is determined in step S39 that the block acquisition number rb does not reach the free block required number r, the process proceeds to step S40. In step S40, the block managing unit 131 determines whether the list selection count i reaches the maximum parallelism q. When it is determined that the list selection count i does not reach the maximum parallelism q, the process is returned to step S33 and a process that is related to the next free block list L(i) is executed.

Meanwhile, when it is determined that the list selection count i reaches the maximum parallelism q, the series of processes based on the flowchart of FIG. 8 ends and the process proceeds to step S18 of FIG. 5. That is, in this case, the acquired free block number does not reach the required number, and a group of free blocks where parallel write is enabled cannot be acquired from the free block lists $141_1$, $141_2, \ldots, 141_m, \ldots,$ and $141_n$ managed by the free block managing unit 140. Thus, the free block selecting process ends.

According to the first embodiment, an order rule is generated such that a group of free blocks where parallel write is enabled can be acquired if the free block lists are selected in the shown order. Even when write with respect to a specific address is repeated from the host apparatus, the difference of the block acquisition counts between the planes can be suppressed by acquiring the free blocks according to the order rule, and the erase operation can be avoided from being concentrated on the specific block.

When the write data with respect to the plural different addresses are accumulated in the buffer memory, the write operation can be avoided from being concentrated on the specific plane, and the parallel write can be performed on as many planes as possible. Therefore, superior transfer performance can be maintained.

In the above description, the management unit is the unique physical block of the chip, such as the free block or the active block, but the invention is not limited to this example. For example, as exemplified in FIG. 9, when plural physical blocks are always collected and used, a logical block where the plural blocks are collected may be used as the management unit.

Figure 9:
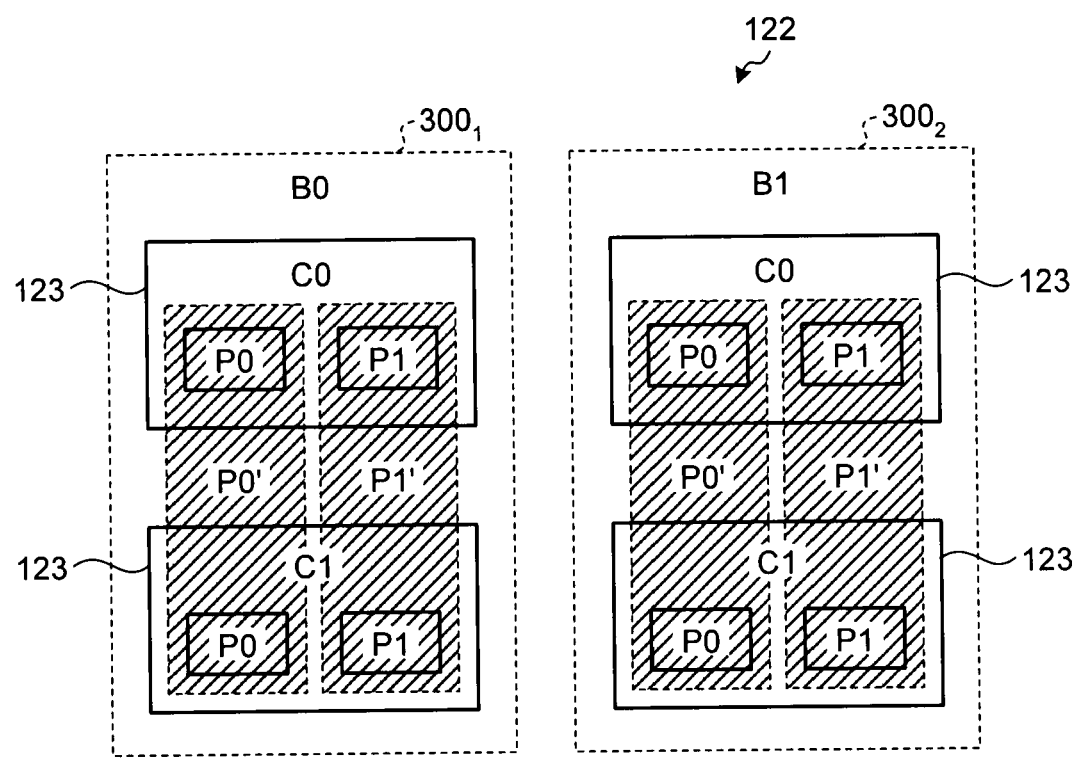
FIG. 9 is a schematic diagram showing an example in which plural physical blocks are always collectively used.

In FIG. 9, the bank-chip-plane configuration is the same as that of FIG. 7 described above. In FIG. 9, in each of the banks B0 and B1, planes that numbers of the chips C0 and C1 correspond are collected and managed. In the example of the bank B0, the plane P0 of the chip C0 and the plane P0 of the chip C1 are collected and managed as a plane P0'. Likewise, the plane P1 of the chip C0 and the plane P1 of the chip C1 are collected and managed as a plane P1'.

In this case, 4 parallel write is enabled by the plane P0' and the plane P1' of the bank B0 and the plane P0' and the plane P1' of the bank B1. The order rule can be applied to the plane P0' and the plane P1' of the bank B0 and the plane P0' and the plane P1' of the bank B1.

Second Embodiment

Next, a second embodiment will be described. In the second embodiment, order rules where all free block lists are arranged once in order in which a group of free blocks enabling maximum parallel write can be acquired are defined as short periods of the order rule. By arranging the short periods in predetermined order, a new long-period order rule is generated.

In the free block selecting method that is described in the first embodiment, the free block number and the active block number may be different between the free block lists, according to the address pattern of the write data. This is because, when the certain address A is overwritten, the active block B1 associated with the address A before write and the free block B2 acquired for write do not necessarily belong to the same plane.

Specifically, when the active block B1 and the free block B2 belong to the different planes, the number of free blocks in the free block list increases by 1 in the free block list that corresponds to the plane to which the active block B1 belongs, and decreases by 1 in the free block list that corresponds to the plane to which the free block B2 belongs.

In a generally used method, since write addresses are stochastically distributed, it is assumed that the difference of the free block numbers between the free block lists is not very large. However, in the order rule that is described in the first embodiment, when the specific pattern exists in the address of the write request, the free blocks may be concentrated on the specific free block list and the free blocks may be exhausted in the other free block lists. In this case, parallelism at the time when the free blocks are selected by the block managing unit 131 is lowered and transfer performance is deteriorated.

Figure 10:
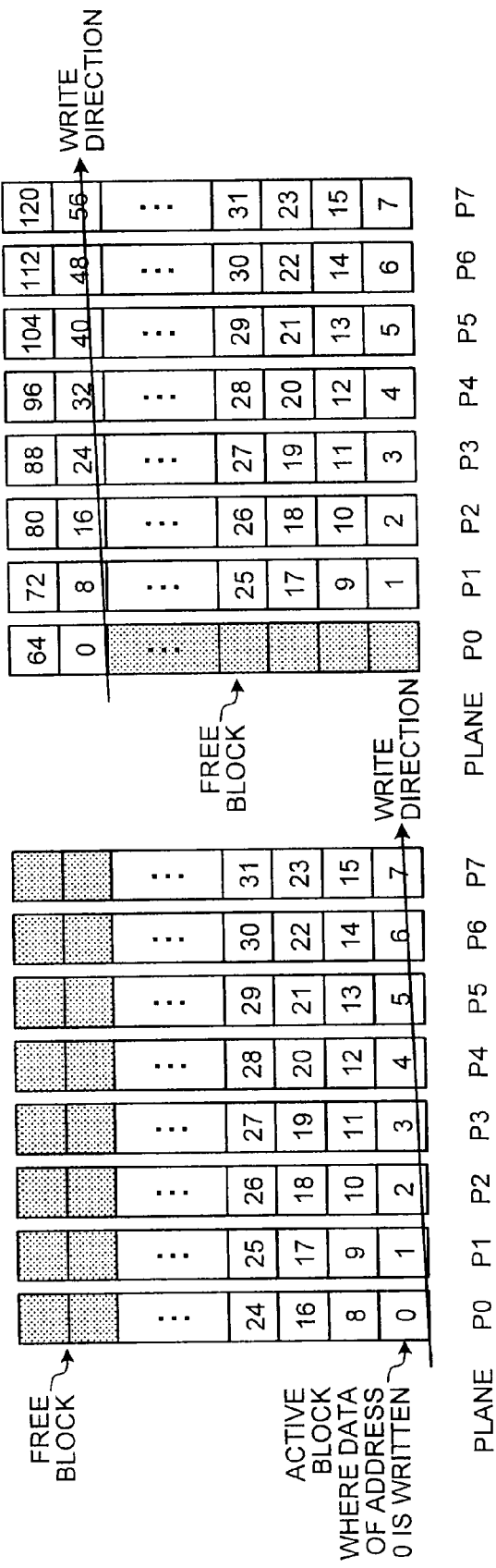
FIGS. 10A and 10B are schematic diagrams showing an example in which write of addresses at a predetermined period is performed.

For example, when write is performed from a head address with respect to the entire capacity provided from the SSD 100 to the host apparatus 200 (it is called full-scale sequential write), active blocks that correspond to addresses of a specific period are concentrated on a specific plane. This will be specifically described using FIG. 10A. When the number of planes is 8, active blocks where addresses correspond to "block size×8" are concentrated on a plane 0. In an example of FIG. 10A, active blocks that correspond to addresses A0, A8, A16, ... are concentrated on a plane P0. This is applicable to the other planes.

Here, the case in which write where addresses become "block size×8" is repeated is considered. In this case, free blocks (shaded portions in FIG. 10A) that are used for write are selected from all planes P0 to P7. Meanwhile, the active blocks that are released after write are concentrated on the plane P0. Accordingly, as exemplified in FIG. 10B, after the active blocks are released, the free blocks are also concentrated on the plane P0.

If periodicity exists in the addresses that are associated with the active blocks belonging to the specific plane, it may become difficult to maintain parallelism at the time of write or equalize the erase counts between the blocks, with respect to the write patterns to overwrite the addresses with the period.

Figure 11:
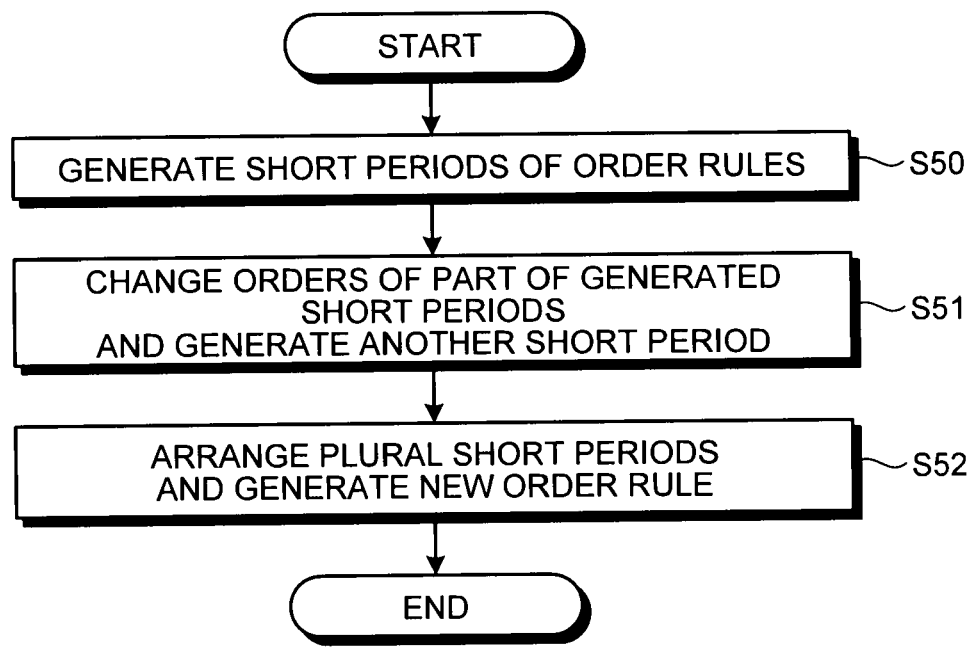
FIG. 11 is a schematic flowchart showing an order rule generating method according to a second embodiment.

In the second embodiment, the order rule according to the first embodiment described above is changed, such that the periodicity is minimized or the period becomes long. FIG. 11 is a flowchart schematically showing an example of a sequence order generating method according to the second embodiment.

First, the order rule is generated in the same way as that of the first embodiment and is defined as a short period (step S50). Next, the order based on the order rule is partially changed in the short period generated in step S50 and another short period is generated (step S51). Finally, the short period that is generated in step S50 and another short period that is generated in step S51 are arranged plurally in predetermined order and a new order rule is generated (step S52). The new order rule is a long-period order rule that has a period longer than that of the original order rule. That is, the long-period order rule is generated on the basis of the plural different short-period order rules.

In step S52, each of the short periods and another short period may be used plural times and the same short period may be continuously used plural times. In step S51, a large number of other short periods that can be generated by changing the free block list in the short period exist. However, when the new order rule is generated in step S52, all short periods that can be considered do not need to be used.

Next, the second embodiment will be described using a specific example. First, as a first example, the case where the number of planes where parallel write is enabled is 2 will be described. Hereinafter, the plane is described as a plane Px (x is an integer that is equal to or more than 0) or simply described as Px, and the address is described as an address Ax or simply described as Ax.

Referring to FIG. 12A, when the number of planes where parallel write is enabled is 2, two kinds of short periods that are shown as a short period A and a short period B below exist as short periods of the order rules. The order rule of each short period can be previously generated and can be held in an order rule table 153.

Short period A: {P0, P1}
Short period B: {P1, P0}

The short periods A and B are arranged and a new order rule is generated. FIG. 12B shows an example in which each of the short period A and the short period B is used four times and an order rule having the length of 16 is generated using 8 short periods. Referring to FIG. 12C, the order rule of the above case is as shown by an expression 4. The position information updating unit 152 updates position information according to the new order rule where the short period A and the short period B are arranged.

$$\{P0,P1,P1,P0,P1,P0,P0,P1,P1,P0,P0,P1, P0,P1,P1, P0\} \quad (4)$$

Figure 13B:
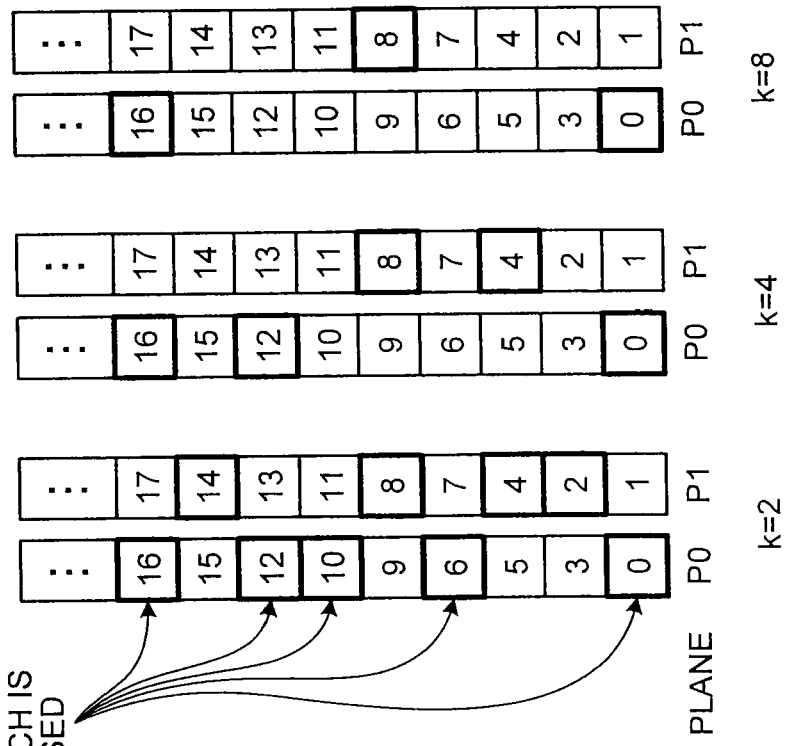
FIGS. 13A and 13B are schematic diagrams showing an example of write of addresses at a predetermined period according to the second embodiment.
Figure 13A:
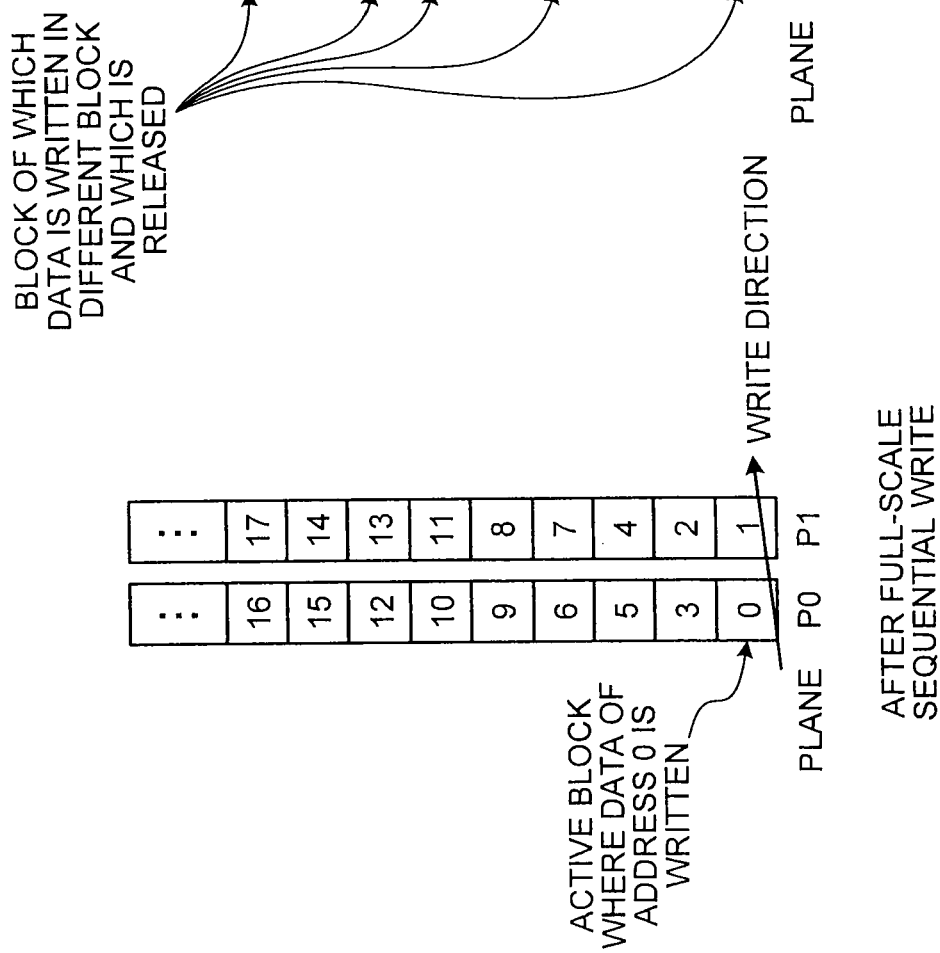

When the full-scale sequential write described above is performed according to the order rule based on the expression 4, the addresses are allocated to the blocks as exemplified in FIG. 13A. That is, the addresses A0 and A1 are allocated to head blocks of the planes P0 and P1 in order of the plane P0 and the plane P1, according to the order rule. The addresses A2 and A3 are allocated to the subsequent blocks in order of the plane P1 and the plane P0. Hereinafter, the addresses A4, A5, . . . are sequentially allocated according to the order rule.

Then, an example in which periodic write where the addresses become "block size×k" is performed is shown in FIG. 13B, in which an example of the case of k=2, an example of the case of k=4, and an example of the case of k=8 are shown.

In the case of k=2, the blocks that correspond to the addresses A0, A2, A4, . . . among the addresses allocated at the time of the full-scale sequential write are released. In the case of k=4, the blocks that correspond to the addresses A0, A4, A8, . . . among the addresses allocated at the time of the full-scale sequential write are released. In the case of k=8, the blocks that correspond to the addresses A0, A8, A16, . . . among the addresses allocated at the time of the full-scale sequential write are released.

If each of k=2, k=4, and k=8 is shown by the planes to which the released blocks belong, the following expressions 5 to 7 are established.

$$k=2: \{P0, P1, P1, P0, P1, P0, P0, P1, \ldots\} \quad (5)$$

$$k=4: \{P0, P1, P1, P0, \ldots\} \quad (6)$$

$$k=8: \{P0, P1, \ldots\} \quad (7)$$

As shown by the expressions 5 to 7, even though write is performed with periods of multiples of the number of planes where parallel write is enabled, the active blocks before write is suppressed from being concentrated on the specific plane. However, when the address period becomes a multiple of the length of the order rule (k=16 in the case of this example), the active blocks before write are concentrated on the specific plane.

Next, an order rule operating method in the order rule operating unit 151 will be described. As forms of the order rule operating unit 151, two kinds of a table method that uses a table where previously generated order rules are held and an operation method that calculates an order rule by an operation are considered.

In the table method, a new order rule that is generated by arranging short periods having order rules is previously held in the order rule table. The order rule operating unit 151 refers to the position on the order sequence under the order rule indicated by the position information Pos on the order rule table 153 and searches an identifier of the free block list, when the free block list is selected.

The operation method is a method in which the order rule operating unit 151 generates a free block identifier from the position information Pos through an operation and generates an order rule. For example, in an example of an order rule where the number of planes is 2 and the length is 16, the plane can be determined by an operation exemplified by the following expression 8.

The expression 8 describes an operation sequence based on a C language that is generally used as a program language. In the C language, binary notation is not allowed. However, in the expression 8, "0" and "1" subsequent to "0b" represent binary numbers by adding "0b" as a prefix. For example, "0b10010110" becomes equal to "0x96" of hexadecimal notation. In the expression 8, each of figures that are described at the head of each row divided by a colon (:) indicates a row number. Five rows that are indicated by row numbers "1" to "5" are collected to configure the expression 8. Contents after double slashes (//) describe the individual rows.

1: pattern=0b10010110; // binary number representing the orders of short periods 2: y=pos / 2; // order of a short period 3: x=pos % 2; // order of a short period among short periods 4: period_id=(pattern>>y) & 0b1; // short period to be used 5: plane_id=period_id ^ x; // Exclusive-OR of short period identifiers and orders in short periods (8)

In the expression 8, the value pos is a value that indicates the position information and takes a value in a range of 0 to 15. The value period_id is a value that indicates the short period, and it is assumed that a value of 0 indicates the short period A and a value of 1 indicates the short period B. The value plane_id indicates a number of the plane that is selected in this order. In the example of the expression 8, the order rule in the short period A and the short period B is represented by the expression of the 5-th row.

Next, the case where the number of planes where parallel write is enabled is large will be described. When the number of planes where parallel write is enabled is large, the number of short periods where the order is changed increases. At this time, when the short periods are combined and an order rule is generated, all of the short periods to be considered do not need to be used. When the selection start position of the free block list is in the middle of the short period, selection of the free block list may be performed over a different short period. Even in this case, preferably, the short periods are selected such that parallelism is maximally maintained and the short periods are arranged.

For example, the case where the number of planes is 8 and restrictions are not imposed on parallel write between the planes is considered. In this case, the number of short periods to be considered becomes 8.

If the short periods (shown by the identifiers of the free block lists corresponding to the planes) shown by the following expressions 9 and 10 are arranged in order of the expression 9 and the expression 10, when the selection of the free block list is performed over the short period shown by the expression 9 and the short period shown by the expression 10, the free block list of the plane P7 is continuously selected. For this reason, a group of blocks where parallel write is enabled over the two short periods cannot be selected.

$$\{0, 1, 2, 3, 4, 5, 6, 7\} \quad (9)$$

$$\{7, 0, 1, 2, 3, 4, 5, 6\} \quad (10)$$

Thus, the short periods are selected and arranged, such that the identifiers of the free block lists at the continuously selected positions do not become the same. Thereby, even though the selection of the free block list is performed over the short periods, a group of free blocks where parallel write is enabled can be selected.

For example, the short periods that are shown by the following expressions 11 and 12 are considered. The order rule shown by the expression 12 can be considered as an order rule that is obtained by advancing the order by 7, with respect to the order rule shown by the expression 11. If the short periods shown by the expressions 11 and 12 are arranged in order of the expression 11 and the expression 12, an identifier of a tail of the expression 11 and an identifier of a head of the expression 12 where the selection is continuously performed are different from each other. For this reason, even when the selection is performed over the short period shown by the expression 11 and the short period shown by the expression 12, a group of free blocks where parallel write is enabled can be selected. Even when the selection is performed over the short periods, a group of free blocks where parallel write having parallelism of 7 is enabled can be selected.

$$\{0, 1, 2, 3, 4, 5, 6, 7\} \quad (11)$$

$$\{1, 2, 3, 4, 5, 6, 7, 0\} \quad (12)$$

Figure 14:
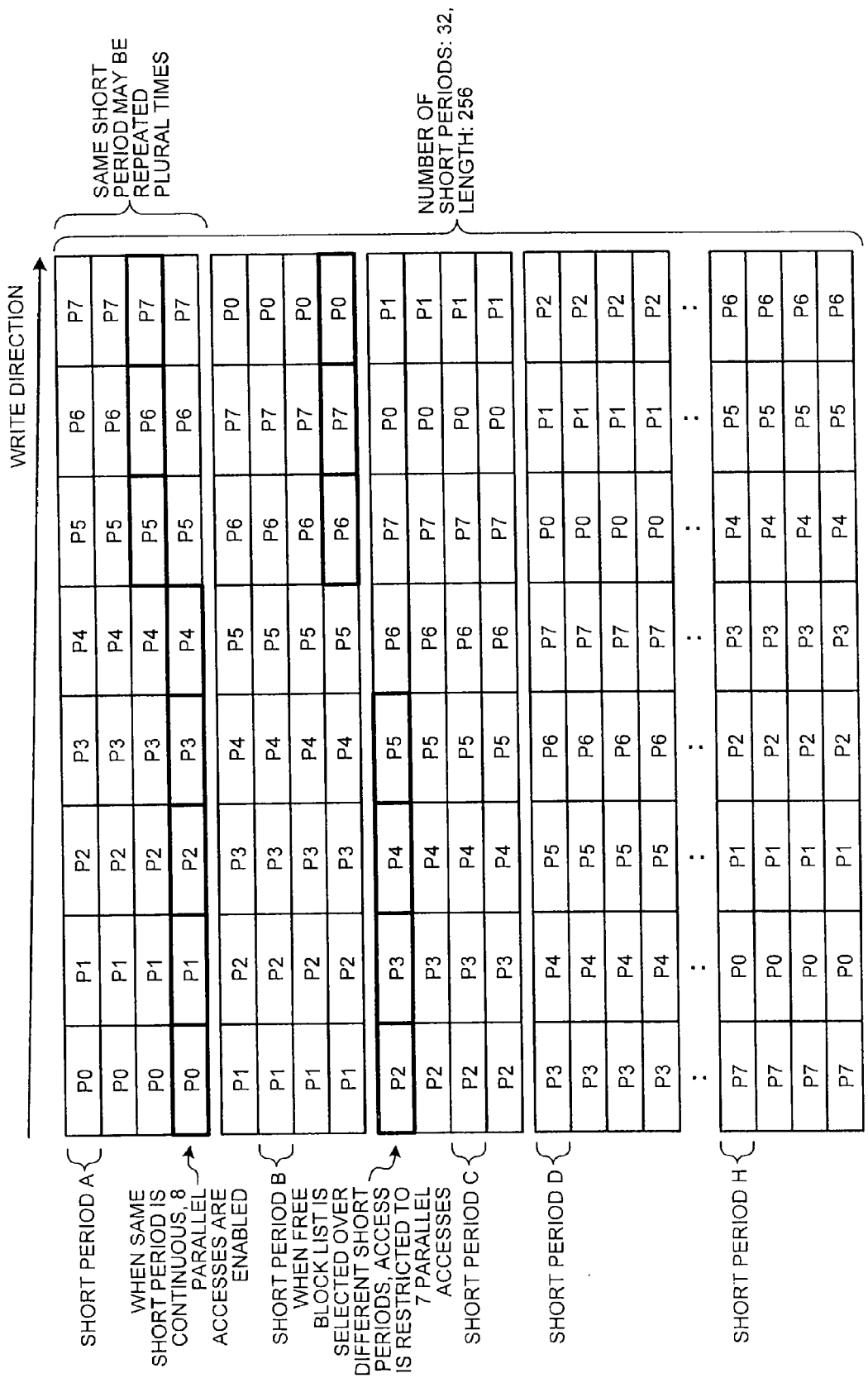
FIG. 14 is a schematic diagram showing an example of an order rule according to the second embodiment when the number of planes is large.

FIG. 14 shows an example of an order rule when the number of planes is 8 (planes P0 to P7) and restrictions are not imposed on parallel write between the planes. The planes P0 to P7 are associated with the identifiers P0 to P7 of different free block lists. In the example of FIG. 14, a short period A based on an order rule {P0, P1, P2, P3, P4, P5, P6, P7} using the identifier P0 as a head and the identifier P7 as a tail and short periods B, C, . . . H that are obtained by advancing the order on the order rule by 7, with respect to the short period A, are arranged and a new order rule is generated. By arranging the different short periods of the order rules, the free blocks can be suppressed from being concentrated on the specific plane.

In the example of FIG. 14, in the new order rule, each of the short periods A to H is repetitively arranged four times, and the total number of short periods becomes 32 and the length becomes 256. The same short period may be repetitively arranged the plural times. In a range where the same short period is repetitively arranged, 8 parallel write is enabled.

The individual short periods A to H are preferably arranged such that parallelism at the time when the selection of the free block list is performed over the different short periods is maximized. In the example of FIG. 14, when the different short periods are adjacent to each other, order rules of the short periods are generated such that the orders in the order rules of the short periods are advanced by 7, in selection order of the free block lists. In this case, even when the selection of the free block list is performed over the short periods, a group of free blocks where parallel write is enabled with parallelism of 7 can be selected.

Next, an example in which the second embodiment is applied to the case where restrictions are imposed on the parallel write in the bank-chip-plane configuration described using FIG. 7 in the first embodiment will be described. In this case, as described above, the maximum parallelism is changed according to the plane from which the free blocks start to be acquired.

Figure 15:
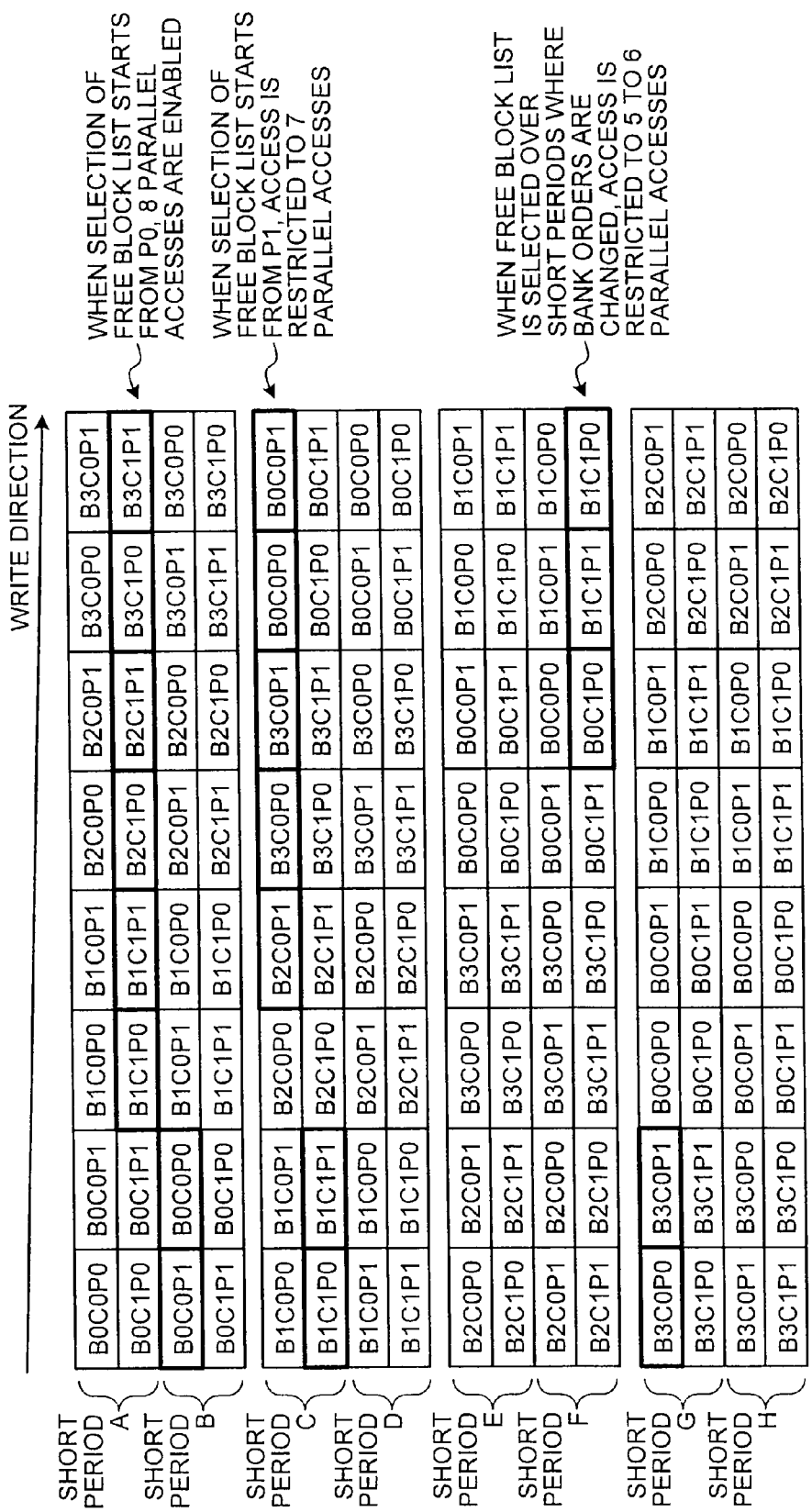
FIG. 15 is a schematic diagram showing an example of an order rule of the bank-chip-plane configuration.

FIG. 15 shows an example of an order rule in the bank-chip-plane configuration. In the example of FIG. 15, the number of banks is 4 (B0 to B3), the number of chips in each of the banks is 2 (C0 and C1), the number of planes in each of the chips is 2 (P0 and P1), and the total number of planes is 16. In this case, since restrictions indicating that the parallel write is disabled with respect to the different chips in the same bank are imposed, the maximum parallelism is 8.

In FIG. 15, an identifier of the free block list that corresponds to each plane is represented as "B0C0P0" by combining a bank number, a chip number, and a plane number.

In the example of FIG. 15, the change is made in order of the plane number, the bank number, and the chip number in the short period and an order rule of each short period is generated, thereby maximizing parallelism. For example, an order rule of the short period A is {B0C0P0, B0C0P1, B1C0P0, B1C0P1, B2C0P0, B2C0P1, B3C0P0, B3C0P1, B0C1P0, B0C1P1, B1C1P0, B1C1P1, B2C1P0, B2C1P1, B3C1P0, B3C1P1}.

In the order rule that is exemplified in FIG. 15, similar to the example described using FIG. 7, when the free blocks start to be acquired from the plane P0, 8 parallel write is enabled. Meanwhile, when the free blocks start to be acquired from the plane P1, since restrictions indicating that the parallel write is disabled with respect to the planes P0 and P1 of the different chips in the same bank are imposed, the parallel write is restricted to 7 parallel write.

The short period B where only the plane number is changed without changing the bank number and the chip number of the short period A is prepared. In order to prevent the free blocks from being concentrated on the specific bank due to write with respect to the periodic addresses, short periods C to H where the orders of the banks are changed with respect to the individual short periods A and B are prepared. Since parallelism is restricted to 5 or 6 when the selection is performed over the short periods where the bank orders are different, the short periods having the same bank number order are continuously arranged, and a new order rule is generated. Specifically, the short period A and the short period B that has the same bank number order as that of the short period A are continuously arranged. Likewise, the short periods C and D, the short periods E and F, and the short periods G and H are continuously arranged, respectively.

In the above description, the order rules where the short periods are arranged by the predetermined number of times are previously generated by the table method or the operation method, but the invention is not limited to this example. For example, the order rules can be dynamically calculated using random numbers.

Figures 16A, 16B, 16C:
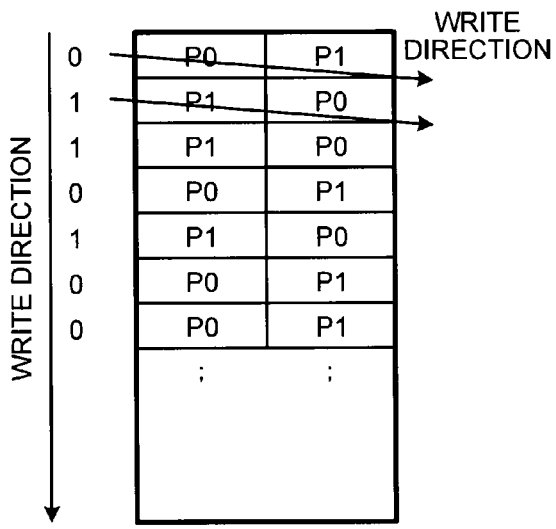
FIGS. 16A to 16C are schematic diagrams showing an example in which an order rule is calculated using a binary random number sequence.

FIGS. 16A to 16C show an example in which an order rule is calculated using a binary random number sequence. In an example of FIGS. 16A to 16C, if a value of a random value is 0 in each short period, the sequence order is calculated as the short period A using the binary random number sequence, and if a value of a random value is 1, the sequence order is calculated as the short period B using the binary random number sequence. When the order rule is calculated according to the binary random number sequence, if the binary random number sequence is pseudo random numbers, the length of the order rule becomes "period of the pseudo random numbers×number of planes". Accordingly, even when periodicity exists in the addresses associated with the active blocks belonging to the specific plane, a period where the active blocks of the corresponding addresses are concentrated on the specific plane becomes greatly long, and this does not cause a problem.

Even when the order rule is calculated using the random numbers, similar to the above case, the table method and the operation method are considered as the forms of the order rule operating unit 151. In the table method, a random number table may be held as the order rule in the order rule table 153.

In the case of the operation method, in the order rule operating unit 151, a random number operator may be prepared and may operate a short period to be used, using the random numbers. For example, the plane based on the random numbers can be determined by an operation shown by the following expression 13. Since the meanings of the method and each value of the expression 13 are common to those of the expression 8 described above, the description will not be repeated herein.

1: y=pos / 2; // order of a short period

2: x=pos % 2; // order of a short period among short periods

3: period_id=rand( ) & 0b1; // determine a short period to be used, on the basis of random numbers 4: plane_id=period_id ^ x; // exclusive logical sum of short period identifiers and orders in short periods     (13)

According to the second embodiment, the short periods having the order rules are arranged in predetermined order and a new order rule having a longer period is generated. For this reason, even when periodicity exists in the write addresses from the host apparatus, the differences of the free block numbers and the active block numbers between the free block lists can be suppressed. In the second embodiment, since the maximum parallelism is configured to be maximized when the short periods are arranged, transfer performance can be maintained.

Third Embodiment

Next, a third embodiment will be described. In the second embodiment described above, the order rule held in the order rule holding unit is lengthened in order to conceal the periodicity in the selection of the free block list. The third embodiment achieves the same effect by modifying the position information update method.

The third embodiment skips a certain order in the order rule, when a current situation is matched with the predetermined condition. As the skipping conditions of the order rule, various conditions can be applied. Next, a first method that skips the order rule when a position information update number reaches a predetermined number and a second method that skips the order rule when a free block acquisition number reaches a predetermined number, for each plane will be described. It is assumed that the skip conditions of the order rule are previously determined for, e.g., the free block selecting unit 150.

First, the first method that skips the order rule when the position information update number reaches the predetermined number will be described using a flowchart of FIG. 17. The flowchart of FIG. 17 corresponds to the process of step S17 in the flowchart of FIG. 5 described above. The flowchart of FIG. 17 is different from the flowchart of FIG. 8 described in the first embodiment in that a skipping process is added.

Figure 17:
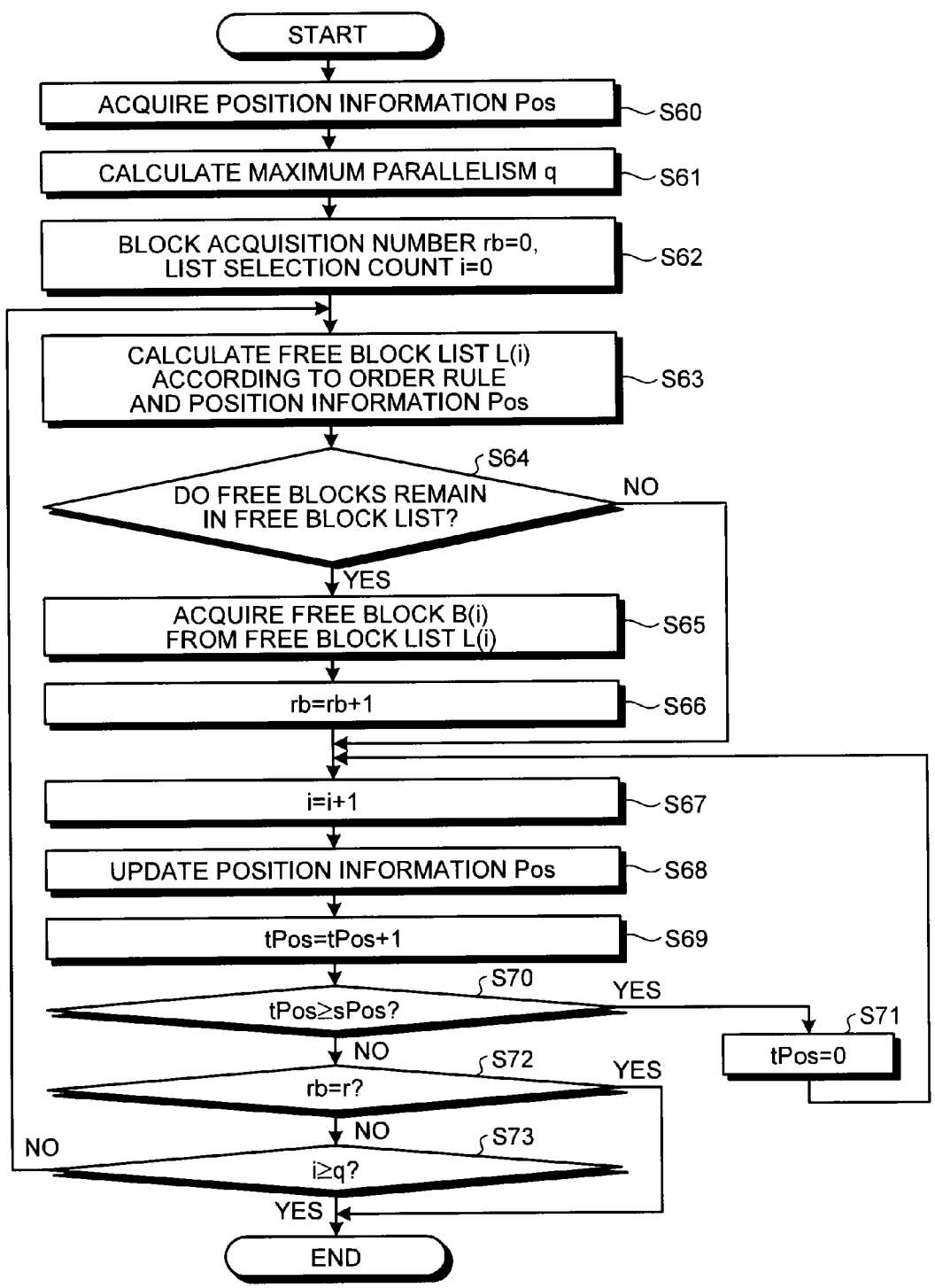
FIG. 17 is a flowchart showing an example of a process of skipping an order rule of a first method of a third embodiment.

In the flowchart of FIG. 17, a position information update number at a certain point of time is set as a position information update number tPos and an initial value thereof is set as 0. A threshold value of the position information update number tPos that is used to determine whether or not to skip the order rule is set as a skip threshold value sPos that is a predetermined value. Further, it is assumed that the free blocks of the required number r are required from the data writing unit 133 in step S16 of FIG. 5, and the order rule is previously determined as the predetermined order rule.

First, the block managing unit 131 acquires position information Pos from the position information storing unit 154 (step S60), and calculates maximum parallelism q at the time when the free blocks start to be selected from the free block list 141$_m$ of the position indicated by the acquired position information Pos (step S61). Since the method of calculating the maximum parallelism q is common to the method illustrated in step S31 of FIG. 8, the description will not be repeated herein.

In a next step S62, the block managing unit 131 initializes each of a block acquisition number rb and a list selection count i to 0, and causes the process to proceed to step S63. In step S63, the order rule operating unit 151 selects one free block list L(i) from the free block lists 141$_1$, 141$_2$, . . . , 141$_m$, . . . , and 141$_n$ managed by the free block managing unit 140, according to the position information Pos delivered from the block managing unit 131 and the predetermined order rule, and returns the selected free block list L(i) to the block managing unit 131.

The block managing unit 131 checks whether the free blocks remain in the free block list L(i) returned from the order rule operating unit 151. When it is determined that the free blocks do not remain in the free block list L(i), the process proceeds to step S67.

Meanwhile, in step S64, when it is determined that the free blocks remain in the free block list L(i), the process proceeds to step S65. In step S65, the free block selecting unit 150 selects a free block B(i) from the free block list L(i). The block managing unit 131 acquires the selected free block B(i). In a next step S66, the block managing unit 131 increases the block acquisition number rb by 1. In a next step S67, the free block selecting unit 150 increases the list selection count i by 1 and counts the list selection count i.

In a next step S68, the position information storing unit 154 updates the position information Pos, which is held in the position information storing unit 154, with position information Pos indicating a next position on the order sequence based on the order rule. At this time, when the next position is out of a final position on the order sequence based on the order rule, the position information updating unit 152 sets the next position to a head of the order sequence based on the order rule.

If the position information Pos is updated, the process proceeds to step S69 and the free block selecting unit 150 increases the position information update number tPos by 1. In a next step S70, the free block selecting unit 150 determines whether the position information update number tPos is equal to or more than a skip threshold value sPos.

When it is determined that the position information update number tPos is equal to or more than the skip threshold value sPos, the process proceeds to step S71, the position information update number tPos is initialized to 0 by the position information updating unit 152, and the process is returned to step S67. The process is returned to step S67 by the determination in step S70 and the skip of the order rule based on the position information update number tPos is executed.

Meanwhile, when it is determined in step S70 that the position information update number tPos is less than the skip threshold value sPos, the process proceeds to step S72. In step S72, the block managing unit 131 determines whether the block acquisition number rb reaches the free block required number r. When it is determined that the block acquisition number rb reaches the free block required number r, a series of processes based on the flowchart of FIG. 17 ends and the process proceeds to step S18 of FIG. 5.

Meanwhile, when it is determined that the block acquisition number rb does not reach the free block required number r, the process proceeds to step S73. In step S73, the block managing unit 131 determines whether the list selection count i reaches the maximum parallelism q. When it is determined that the list selection count i does not reach the maximum parallelism q, the process is returned to step S63 and a process that is related to the next free block list L(i) is executed.

Meanwhile, when it is determined that the list selection count i reaches the maximum parallelism q, the series of processes based on the flowchart of FIG. 17 ends and the process proceeds to step S18 of FIG. 5.

Figure 18:
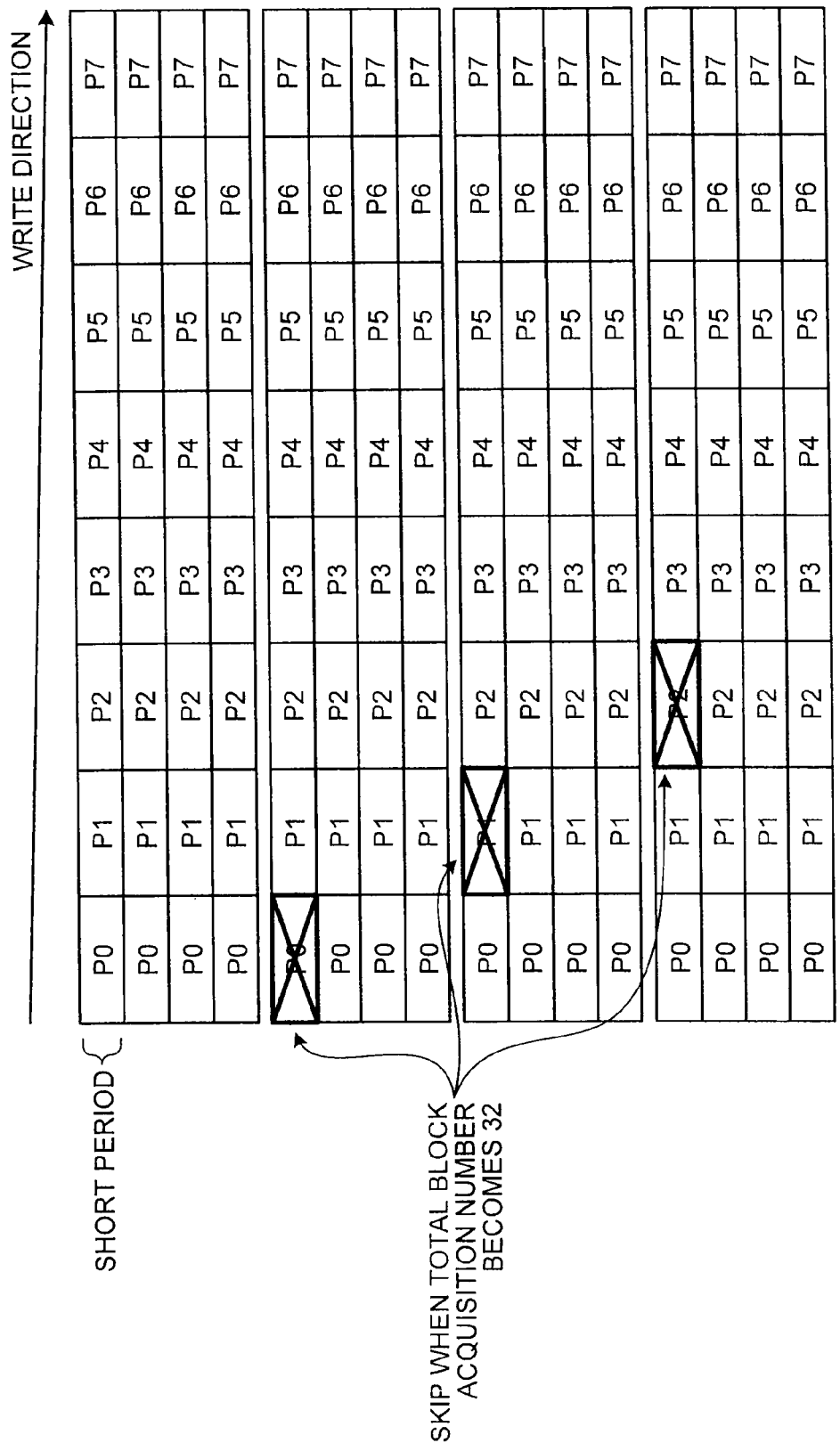
FIG. 18 is a schematic diagram showing an example in which the order rule of the first method of the third embodiment is skipped.

FIG. 18 shows an example in which the skip of the order rule is performed according to the processes based on the flowchart of FIG. 17 described above. In FIG. 18, the number of planes is 8 and 8 parallel write is enabled. The original order rule is an order sequence where only the short period {0, 1, 2, 3, 4, 5, 6, 7} is repeated. FIG. 18 shows an example in which the position information Pos is updated with the next position and the order rule is skipped, in the case where the skip threshold value sPos is set as 32 blocks and the position information update number tPos becomes 32.

In an example of FIG. 18, if the free blocks are acquired from the 32-th plane P7 in the order sequence of the original order rule, acquisition of the free blocks from the next 33-th plane P0 is skipped. In addition, if the position information update number tPos is initialized to 0, the position information update number tPos restarts to be accumulated, and the position information update number tPos becomes 32, the position information Pos is updated with the next position and the order rule is skipped. In this case, acquisition of the free blocks from the 66-th plane P1 in the order sequence of the original order rule is skipped.

Specifically, first, when the free block is acquired from the 32-th plane P7 in the order sequence of the original order rule, the position information update number tPos becomes 32, and the process is returned from step S70 to step S67 through step S71 in the flowchart of FIG. 17. In step S68, the position information Pos is updated, and the process is returned to step S63 through the processes of steps S69 to S73. The position information Pos is updated without acquiring the free block by the determination of step S70, and the order rule is skipped.

The skip threshold value sPos is preferably set to a multiple of the length of the order rule to equalize the skip frequency between the free block lists. That is, when the skip threshold value sPos is set to the multiple of the length of the order rule, if the free blocks of the number that corresponds to the length of the order rule are acquired, a next plane is skipped and the free blocks of the number that corresponds to the length of the order rule are acquired from a next plane of the skipped plane. Thereby, the order rule is shifted by one plane at the skip position and erase counts between the blocks are equalized.

Meanwhile, if the skip threshold value sPos is set to (a multiple of the length of the order rule)−1, the skip is generated in only the specific free block list, and this is not preferable.

Figure 19:
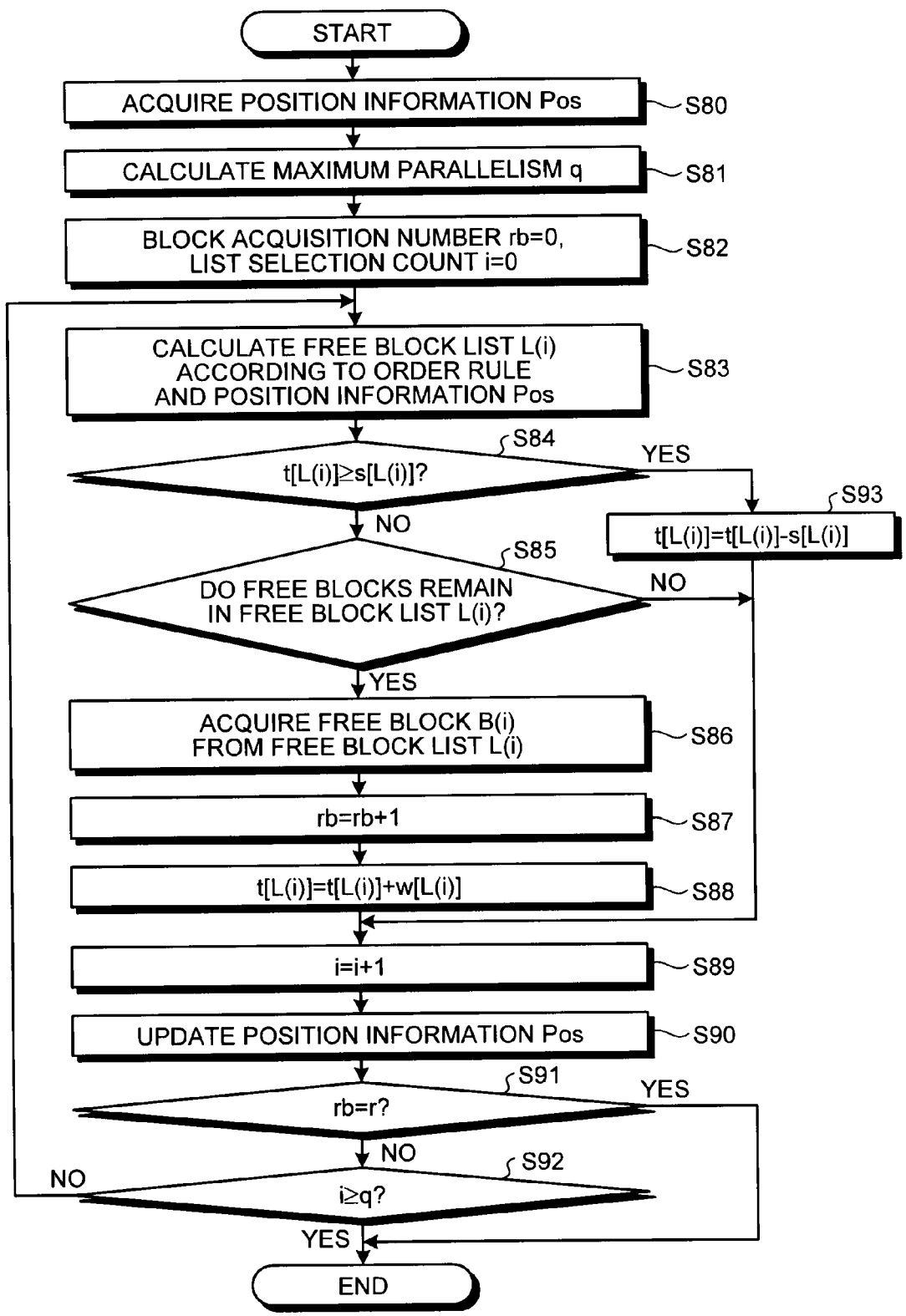
FIG. 19 is a flowchart showing an example of a process of skipping an order rule of a second method of a third embodiment.

Next, the second method in the third embodiment will be described using the flowchart of FIG. 19. The method skips the order rule when the free block acquisition number reaches the predetermined number for each plane. The processes based on the flowchart of FIG. 19 are substantially the same as the processes based on the flowchart of FIG. 17 according to the first method described above, except that timing at which the skipping process is executed is different. That is, in the second method, a determination of the skip conditions of the order rule is executed for each plane in order to control the skip frequency for each plane.

In this method, block acquisition score t[L] is introduced for each free block list L. t[L] increases in a unit of score incremental value w[L] when a block is acquired from free block list. If t[L] reaches skip threshold value s[L], the order of the free block list L is skipped. The score incremental value w[L], the block acquisition score t[L], and the skip threshold value s[L] are held for each plane, in the block managing unit 131.

First, the block managing unit 131 acquires position information Pos from the position information storing unit 154 (step S80), and calculates maximum parallelism q at the time when the free blocks start to be selected from the free block list $141_m$ of the position indicated by the acquired position information Pos (step S81). Since the method of calculating the maximum parallelism q is common to the method illustrated in step S31 of FIG. 8, the description will not be repeated herein.

In a next step S82, each of a block acquisition number rb and a list selection count i is initialized to 0 and the process proceeds to step S83. In step S83, the order rule operating unit 151 selects one free block list L(i) from the free block lists $141_1, 141_2, \ldots, 141_m, \ldots,$ and $141_n$ managed by the free block managing unit 140, according to the position information Pos delivered from the block managing unit 131 and the predetermined order rule, and returns the selected free block list L(i) to the block managing unit 131.

In a next step S84, the free block selecting unit 150 compares the block acquisition score t[L(i)] and the skip threshold value s[L(i)] and determines whether the block acquisition score t[L(i)] is equal to or more than the skip threshold value s[L(i)]. When it is determined that the block acquisition score t[L(i)] is equal to or more than the skip threshold value s[L(i)], in step S93, a value that is obtained by subtracting the skip threshold value s[L(i)] from the block acquisition score t[L(i)] is set as a new block acquisition score t[L(i)] and the process proceeds to step S89. Since the process proceeds to step S89 when it is determined that the block acquisition score t[L(i)] is equal to or more than the skip threshold value s[L(i)], the order rule is skipped in the plane that corresponds to the free block list L(i).

Meanwhile, in step S84, when it is determined that the block acquisition score t[L(i)] is less than the skip threshold value s[L(i)], the process proceeds to step S85. In step S85, the block managing unit 131 checks whether the free blocks remain in the free block list L(i) returned from the order rule operating unit 151. When it is determined that the free blocks do not remain in the free block list L(i), the process proceeds to step S89.

Meanwhile, in step S85, when it is determined that the free blocks remain in the free block list L(i), the process proceeds to step S86. In step S86, the free block selecting unit 150 selects a free block B(i) from the free block list L(i). The block managing unit 131 acquires the selected free block B(i).

In a next step S87, the block acquisition number rb is increased by 1. In a next step S88, the free block selecting unit 150 sets a value obtained by adding the score increase value w[L(i)] to the block acquisition score t[L(i)] as a new block acquisition score t[L(i)]. The process proceeds to step S89 and the free block selecting unit 150 increases the list selection count i by 1 and counts the list selection count i.

In a next step S90, the position information updating unit 152 updates the position information Pos, which is held in the position information storing unit 154, with position information Pos indicating a next position on the order sequence based on the order rule. At this time, when the next position is out of a final position on the order sequence based on the order rule, the position information updating unit 152 sets the next position to a head of the order sequence based on the order rule.

If the position information Pos is updated, the process proceeds to step S91 and the block managing unit 131 determines whether the block acquisition number rb reaches the free block required number r. When it is determined that the block acquisition number rb reaches the free block required number r, a series of processes based on the flowchart of FIG. 19 ends and the process proceeds to step S18 of FIG. 5.

Meanwhile, when it is determined in step S91 that the block acquisition number rb does not reach the free block required number r, the process proceeds to step S92. In step S92, the block managing unit 131 determines whether the list selection count i reaches the maximum parallelism q. When it is determined that the list selection count i does not reach the maximum parallelism q, the process is returned to step S83 and a process that is related to the next free block list L(i) is executed.

Meanwhile, when it is determined that the list selection count i reaches the maximum parallelism q, the series of processes based on the flowchart of FIG. 19 ends and the process proceeds to step S18 of FIG. 5.

When the plural free block lists L have the score increase value w[L] and the skip threshold value s[L] of the same values, if the initial value of the block acquisition score s[L] is also set to the same value (for example, 0), since the skip of the plural free block lists is performed at the same timing, this is not preferable. For this reason, the initial value of the block acquisition score s[L] may be set as a different value, for each free block list L.

FIGS. 20A and 20B show an example in which the skip on the order rule is performed according to the processes based on the flowchart of FIG. 19 described above. FIG. 20A shows an initial value of the block acquisition score t[L], the score increase value w[L], and the skip threshold value s[L] that are set to each of the planes P0 to P7. FIG. 20B shows an example in which the number of planes is 8, 8 parallel write is enabled, and the original order rule becomes an order sequence where only a short period {0, 1, 2, 3, 4, 5, 6, 7} is repeated, similar to FIG. 18 described above.

In the example of FIG. 20A, the score increase value w[L] is fixed to 1 and the skip threshold value s[L] can be changed for each plane. The block acquisition score t[L] shows a free block acquisition number in each plane and the skip threshold value s[L] shows a free block acquisition number in the plane where the skip of the order rule is generated.

In the example of FIG. 20A, the skip threshold value s[L] is set as 8 in only the plane P6 and is set as 32 in the other planes. For this reason, as exemplified in FIG. 20B, the plane P6 can increase the frequency of the skip with respect to the other planes. In the example of FIG. 20B, in the plane P6, the skip is generated two times, when the short period is repeated 16 times. Meanwhile, in the other planes, the frequency of the skip becomes equal to or less than 1.

As the initial value of the block acquisition score t[L], a different value can be set for each plane. In the example of FIG. 20A, in the individual planes P0 to P7, the initial value of the block acquisition score t[L] is shifted by a value (=4) obtained by dividing the skip threshold value s[L] (=32) by the number of planes (=8). Thereby, in the seven planes other than the plane P6, the phase of the skip is shifted by 4 short periods. For example, in the example of FIG. 20B, the skip of the plane P0 occurs in the fifth short period with respect to the initial value 28 of the block acquisition score t[P0], and the skip of plane P1 occurs in the ninth short period with respect to the initial value 24 of the block acquisition score t[P1]. Likewise, the skip of the plane P2 occurs in the 13-th short period with respect to the initial value 20 of the block acquisition score t[P2].

FIGS. 21A and 21B show an example in which the skip threshold value s[L] is fixed and the score increase value w[L] can be changed for each plane, in contrast as the example of FIGS. 20A and 20B described above. As exemplified in FIG. 21A, the skip threshold value s[L] is fixed to 100, and the score increase value w[L] of only the plane P6 becomes 25 and the score increase values of the other planes become 3. The initial value of the block acquisition score t[L] is shifted on the basis of a value (=12.5) obtained by dividing the skip threshold value s[L] (=100) by the number of planes (=8). In this case, it can be seen that the frequency of the skip increases when the score increase value w[L] increases.

According to the third embodiment, even though the order rule is not complicated and does not have the long period, the period of the order rule looks long and irregular, and the periodicity in the selection of the free block list can be concealed.

For example, when the total block number or free block number of only the specific plane is small, if the skip threshold value s[L] is set to a small value or the score increase value w[L] is set to a large value, the acquisition frequency of the free block can be suppressed. Thereby, it can be expected to equalize the erase count for each block or equalize the remaining free block number for each plane.

Modification of the Third Embodiment

Next, a modification of the third embodiment will be described. The modification of the third embodiment is a combination example of the second embodiment and the third embodiment. FIG. 22 shows an example in which the bank-chip-plane configuration which is used in the example of FIG. 15 described above and in which the number of banks is 4, the number of chips in each of the banks is 2, the number of planes in each of the chips is 2, and the total plane number is 16 is applied to the modification of the third embodiment.

In the example of FIG. 15 that is described in the second embodiment, since the short period where the bank order is changed is also included in the order rule, the order rule is very long and complicated. Meanwhile, in the order rule according to the modification of the third embodiment that is exemplified in FIG. 22, since the effect of changing the bank order is realized by the skip, the order rule has the simple configuration where the two short periods of the short periods A and B are combined.

Specifically, as described using FIG. 15 in the second embodiment, the order rule operating unit 151 changes the short period in order of the plane number, the bank number, and the chip number and generates an order rule of each short period. For example, the order rule of the short period A becomes {B0C0P0, B0C0P1, B1C0P0, B1C0P1, B2C0P0, B2C0P1, B3C0P0, B3C0P1, B0C1P0, B0C1P1, B1C1P0, B1C1P1, B2C1P0, B2C1P1, B3C1P0, B3C1P1}. The short period B is generated by changing only the plane number of the short period A without changing the bank number and the chip number of the short period A.

As described above, the order rule operating unit 151 arranges the short period A and the short period B in the order obtained by the table method, the operation method or the method using the random numbers, and generates a new order rule. Thereby, an order rule where the number of short periods is 8 and the length is 128 is generated.

Meanwhile, by the first method or the second method of the third embodiment described above, the order rule is set to be skipped, whenever the free blocks, for example, 128 blocks are acquired. In this way, the effect of changing the bank order can be realized whenever the order rule is skipped.

As described above, when the write with respect to the specific address is repeated from the host apparatus, the difference of the free block acquisition counts between the planes can be suppressed and the erase count can be avoided from being concentrated in the specific block.

Since the parallel write is performed with respect to as many planes as possible, when the write data with respect to the plural different addresses is accumulated in the buffer memory, the write can be suppressed from being concentrated on the specific plane, and superior transfer performance can be maintained.

The short periods are arranged and the period of the order rule is lengthened. For this reason, even when the periodicity exists in the write addresses from the host apparatus, the difference of the free block number and the active block number between the free block lists can be suppressed. When the short periods are arranged, since the parallelism is maximally implemented, transfer performance can be maintained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   a nonvolatile memory that includes a plurality of storage areas each including a plurality of blocks, each of which is a unit of data-erase, the nonvolatile memory being configured such that parallel write is enabled with respect to the blocks included in the different storage areas;
   a managing unit that holds, for each of the plurality of storage areas, a plurality of free block lists, each of the free block lists indicating zero or more free blocks where valid data is not stored;
   an order rule holding unit that holds an order rule that is information used to determine an order of the plurality of free block lists;
   a position information storing unit that stores position information indicating the position of one of the plurality of free block lists in the order rule;
   a list selecting unit that selects a free block list from the plurality of free block lists corresponding to the position indicated by the position information;
   a block selecting unit that selects the free block from the free block list selected by the list selecting unit;
   a writing unit that writes data in the free block selected by the block selecting unit; and
   an updating unit that updates, after the free block list is selected by the list selecting unit, the position information stored in the position information storing unit with position information indicating the position of a subsequently selected free block list from the plurality of free block lists.

2. The system of claim 1,
   wherein the block selecting unit skips selection of the free block when a predetermined condition determined in the block selecting unit is satisfied in selecting the free block, and
   the updating unit further updates the position information when the block selecting unit skips the selection of the free block.

3. The system of claim 2,
   wherein the block selecting unit counts, for each of the plurality of free block lists, the number of times the free block list is selected by the list selecting unit, and skips selection of the free block in the free block list when the free block list is selected by the list selecting unit and the number of times of counting the selected list is equal to or more than a threshold value.

4. The system of claim 2,
   wherein the block selecting unit counts the number of times the updating unit updates the position information, and skips selection of the free block when the counted number of times is equal to or more than a threshold value.

5. The system of claim 2,
   wherein the position information storing unit stores position information that indicates the order of the plurality of free block lists determined on the basis of a long-period order rule generated using a plurality of different order rules.

6. The system of claim 5,
   wherein the list selecting unit selects the free block list through an operation using the plurality of order rules and the position information.

7. The system of claim 5,
   wherein the order rule holding unit holds the long-period order rule that is generated in advance, and
   the list selecting unit refers to the long-period order rule that is held in the order rule holding unit and selects the free block list.

8. The system of claim 5,
   wherein the list selecting unit dynamically generates the long-period order rule using random numbers and selects the free block list using the generated long-period order rule.

9. A memory system, comprising:
   a nonvolatile memory that includes a plurality of storage areas each including a plurality of blocks, each of which is a unit of data-erase, the nonvolatile memory being configured such that parallel write is enabled with respect to the blocks included in the different storage areas;
   a managing unit that holds, for each of the plurality of storage areas, a plurality of free block lists, each of the plurality of free block lists indicating 0 or one or more free blocks that are the blocks where valid data is not stored;
an order rule holding unit that holds an order rule that is information used to determine an order of the plurality of free block lists;
a position information storing unit that stores position information indicating the position of one of the plurality of free block lists in the order rule;
a list selecting unit that selects a free block list from the plurality of free block lists corresponding to the position indicated by the position information;
a block selecting unit that selects the free block from the free block list selected by the list selecting unit;
a writing unit that writes data in the free block selected by the block selecting unit; and
an updating unit that updates, after the free block list is selected by the list selecting unit, the position information stored in the position information storing unit with position information indicating the position of a subsequently selected free block list from the plurality of free block lists,
wherein the position information storing unit stores position information that indicates the order of the plurality of free block lists determined on the basis of a long-period order rule generated using a plurality of different order rules.

* * * * *